(12) United States Patent
Yamada et al.

(10) Patent No.: US 8,830,350 B2
(45) Date of Patent: Sep. 9, 2014

(54) IMAGE PROCESSING APPARATUS, IMAGE PROCESSING METHOD, AND COMPUTER PROGRAM

(75) Inventors: Rui Yamada, Kanagawa (JP); Mitsuharu Ohki, Tokyo (JP)

(73) Assignee: Sony Corporation, Tokyo (JP)

( * ) Notice: Subject to any disclaimer, the term of this patent is extended or adjusted under 35 U.S.C. 154(b) by 363 days.

(21) Appl. No.: 13/177,226

(22) Filed: Jul. 6, 2011

(65) Prior Publication Data

US 2011/0280479 A1 Nov. 17, 2011

Related U.S. Application Data

(63) Continuation of application No. 12/633,549, filed on Dec. 8, 2009, now abandoned, which is a continuation of application No. 10/565,597, filed as application No. PCT/JP2005/007854 on Apr. 25, 2005, now Pat. No. 7,656,437.

(30) Foreign Application Priority Data

May 27, 2004 (JP) .................................. 2004-157098
Oct. 19, 2004 (JP) .................................. 2004-303795

(51) Int. Cl.
- *H04N 9/73* (2006.01)
- *H04N 9/04* (2006.01)
- *H04N 9/64* (2006.01)

(52) U.S. Cl.
CPC ............... *H04N 9/646* (2013.01); *H04N 9/045* (2013.01)
USPC ..................................................... 348/223.1

(58) Field of Classification Search
USPC ......... 348/228.1, 362, 294, 297, 223.1–229.1
See application file for complete search history.

(56) References Cited

U.S. PATENT DOCUMENTS

| 6,999,116 B1 * | 2/2006 | Hieda ........................ 348/222.1 |
| 7,061,528 B1 | 6/2006 | Honma |
| 7,577,292 B2 | 8/2009 | Kang |

(Continued)

FOREIGN PATENT DOCUMENTS

| JP | 11-313336 | 11/1999 |
| JP | 2000-244939 | 9/2000 |

(Continued)

OTHER PUBLICATIONS

Baek-Kyu Kim et al., "Automatic Detection and Correction of Purple Fringing Using the Gradient Information and Desaturation," $16^{th}$ European Signal Processing Conference, Aug. 25-29, 2008, 5 pages.
Supplementary European Search Report, issued from the European Patent Office for Application No. 05734591.0, dated Feb. 27, 2013, 3 pages.

*Primary Examiner* — Yogesh Aggarwal

(74) *Attorney, Agent, or Firm* — Finnegan Henderson Farabow Garrett & Dunner LLP

(57) ABSTRACT

An apparatus and a method for efficiently executing correction of false color, such as purple fringe, caused by chromatic aberration and for generating and outputting high-quality image data are provided. A white-saturated pixel is detected from image data, a false-color-pixel detection area is set around the detected white-saturated pixel, and pixels having color corresponding to false color such as purple fringe are detected from the set area. The detected pixels are determined as false-color pixels and correction processing based on the values of the surrounding pixels is performed on the determined false-color pixels. With this configuration, an area of false color such as purple fringe generated in the neighborhood of a white-saturated pixel can be efficiently detected, pixel values can be partially corrected, and high-quality image data can be generated and output without affecting the entire image.

15 Claims, 22 Drawing Sheets

(56) References Cited

U.S. PATENT DOCUMENTS

| | | |
|---|---|---|
| 7,577,311 B2 | 8/2009 | Palum et al. |
| 2004/0183919 A1* | 9/2004 | Yamamoto ................ 348/222.1 |
| 2006/0256226 A1 | 11/2006 | Alon et al. |

FOREIGN PATENT DOCUMENTS

| | | |
|---|---|---|
| JP | 2002-262299 A | 9/2002 |
| JP | 2003-060983 | 2/2003 |
| JP | 2004-328564 | 11/2004 |

* cited by examiner

FIG. 20

| LUMINANCE OF REFERENCE IMAGE | ACTUAL LUMINANCE OF SUBJECT | FALSE-COLOR (PF) GENERABLE PIXEL RANGE(THE NUMBER OF PIXELS FROM WHITE SATURATION |
|---|---|---|
| aaa | ccc | nn PIXELS |
| .. | .. | .. |
| 005 | 500 | 10 PIXELS |
| .. | .. | .. |
| 50 | 5000 | 20 PIXELS |
| .. | .. | .. |
| bbb | ddd | mm PIXELS |

IMAGE PROCESSING APPARATUS, IMAGE PROCESSING METHOD, AND COMPUTER PROGRAM

This is a Continuation of application Ser. No. 12/633,549, filed on Dec. 8, 2009, currently pending, which is a Continuation of application Ser. No. 10/565,597, filed on Aug. 11, 2006. Application Ser. No. 10/565,597 is the U.S. National Stage of International Application No. PCT/JP2005/007854, filed on Apr. 25, 2005, and claims priority to Japanese Patent Application No. 2004-303795, filed Oct. 19, 2004, and Japanese Patent Application No. 2004-157098, filed May 27, 2004. The entire contents of these applications are incorporated herein by reference.

TECHNICAL FIELD

The present invention relates to image processing apparatuses, image processing methods, and computer programs. More specifically, the present invention relates to an image processing apparatus, an image processing method, and a computer program for generating high-quality image data by correcting image data in which false color is generated, for example, due to lens aberration.

BACKGROUND ART

For photographing with a camera, various problems are caused by lens aberration. Examples of typical chromatic aberration include Seidel's five aberrations, which are monochromatic aberrations. This is five aberrations analyzed by Seidel in Germany and based on a lens sphere and is a collective term of spherical aberration, coma aberration, astigmatism aberration, distortion aberration, and field curvature. Apart from those aberrations, it is known that chromatic aberration can also cause a serious problem. The chromatic aberration results from the fact that the refractive index of light with respect to lens material varies due to its wavelength, and produces false color at an image capture surface.

As typical examples of chromatic aberration, axial chromatic aberration, which causes color blur since a focal-point position on an optical axis varies depending on the wavelength, and magnification chromatic aberration, which causes color shift since the image magnification varies depending on the wavelength, are well known. In general, a phenomenon called "purple fringe (purple fringe)" in English is also an important cause of image deterioration. This is a phenomenon in which false color is generated at an edge portion in an image because of a difference in point spread due to a light wavelength. Even when it is not so visible among typical pixels, the presence of a high-contrast edge portion where white saturation, i.e., a state in which the luminance level is saturated, occurs causes purple false color to be generated around the edge portion, thus forming an unnatural image. In general, false color generated in the neighborhood of a white-saturated portion is called "purple fringe" since a large amount of purple-based color is generated. However, the false color may be any colors, such as green-tinted color, depending on a lens and photography conditions. Hereinafter, the "purple fringe" refers to a false-color generation phenomenon that occurs at a high-contrast edge portion where white saturation occurs, regardless of color generated.

As a technology for reducing color aberration, lenses using glass made of special material, such as fluorite, are available. However, since high cost is required to manufacture such lenses, the price is also high. Such lenses are used for some high-class cameras, such as lens-replaceable cameras, but cannot be said to be widely used.

Patent Document 1 describes a method for reducing false color generated due to chromatic aberration by performing image processing. In this processing, processing for suppressing color, i.e., reducing color saturation, is performed on a portion where green-channel high-frequency components are high. As measures for a case in which white saturation occurs, Patent Document 1 also discloses a configuration for performing processing for reducing the color saturation of a white-saturated portion by photographing two images with varied exposure and estimating the original luminance of the white-saturated portion.

However, in the processing described in Patent Document 1, since the false color is reduced by reducing the color saturation, the color saturation of original subject color is also reduced to thereby make it impossible to faithfully reproduce the original color of the subject. As a result, there is a problem in that an image that looks unnatural is output. Additionally, in order to estimate the luminance of a white-saturated portion, photography needs to be performed twice. When hand movement or subject movement occurs during the two photography operations, there is a problem in that it is difficult to obtain a correct result.

[Patent Document 1] Japanese Unexamined Patent Application Publication No. 2003-60983

DISCLOSURE OF INVENTION

The present invention has been made in view of the problems described above, and an object of the present invention is to provide an image processing apparatus, an image processing method, and a computer program which allow high-quality image data to be generated and output without affecting the entire image, by paying attention to false color such as purple fringe generated around a white-saturated portion, efficiently detecting the false color area, and executing partial correction.

A first aspect of the present invention provides an image processing apparatus.

The image processing apparatus has:

a white-saturation detection unit for detecting a white saturated pixel from image data;

a false-color-pixel detection-area setting unit for setting a false-color-pixel detection area around the white-saturated pixel detected by the white-saturation detection unit;

a false-color detection unit for identifying pixels having color corresponding to false color as false-color pixels in the area set by the false-color-pixel detection-area setting unit; and a pixel-value correction unit for executing pixel-value correction processing, based on values of surrounding pixels, on the false-color pixels detected by the false-color detection unit.

In addition, according to one embodiment of the image processing apparatus of the present invention, the pixel-value correction unit has a compensation interpolation unit for executing compensation interpolation processing, based on the surrounding pixel values, on the false-color pixels, and a color blur processing unit for executing color blur processing on the false-color pixels.

Additionally, according to one embodiment of the image processing apparatus of the present invention, the pixel-value correction unit selects pixels other than false-color pixels and white-saturated pixels from pixels that exist around the false-color pixels and executes compensation interpolation processing based on the selected pixels.

Additionally, according to one embodiment of the image processing apparatus of the present invention, the false-color detection unit executes processing for identifying, as false-color pixels, pixels having preset specific color in the area set by the false-color-pixel detection-area setting unit.

Additionally, according to one embodiment of the image processing apparatus of the present invention, the false color is purple fringe, and the false-color detection unit executes processing for identifying, as false-color pixels, purple pixels in the area set by the false-color-pixel detection-area setting unit.

Additionally, according to one embodiment of the image processing apparatus of the present invention, the false-color-pixel detection-area setting unit executes processing for determining the false-color-pixel detection area set around the white-saturated pixel detected by the white-saturation detection unit, in accordance with at least one piece of data of a diaphragm during photography of image data to be processed, focal distance information, and a distance from an optical center to a white-saturated pixel (x, y).

Additionally, according to one embodiment of the image processing apparatus of the present invention, the white-saturation detection unit executes processing for selecting a white-saturated pixel having a luminance higher than or equal to a predetermined threshold.

Additionally, according to one embodiment of the image processing apparatus of the present invention, the image processing apparatus further has a color conversion unit for executing data conversion processing for separating input image data into luminance-component image data and color-component image data, and executes pixel-value correction processing based on the converted data generated by the color conversion unit.

Additionally, according to one embodiment of the image processing apparatus of the present invention, the false-color-pixel detection-area setting unit has a reference-image analyzing unit for receiving a reference image in which a pixel at a position corresponding to a white-saturated pixel in an image to be processed does not have a saturation luminance value and obtaining a luminance value of the reference-image pixel corresponding to the white-saturated pixel in the image to be processed. The reference image is a photographed image of the same subject as the image to be processed. The false-color-pixel detection-area setting unit further has a false-color-pixel detection-area determining unit for setting a false-color-pixel detection area in accordance with the luminance value of the corresponding reference-image pixel, the luminance value being obtained by the reference-image analyzing unit.

Additionally, according to one embodiment of the image processing apparatus of the present invention, the false-color-pixel detection-area determining unit sets a false-color-pixel detection area by using a lookup table in which the luminance value of the reference image and a false-color generable pixel range or the false-color-pixel detection area are associated with each other.

Additionally, according to one embodiment of the image processing apparatus of the present invention, the false-color-pixel detection-area determining unit executes processing for setting a wider false-color-pixel detection area as the luminance value of a corresponding pixel in the reference image increases.

Additionally, according to one embodiment of the image processing apparatus of the present invention, by using, as the reference image, an image photographed by an image capture device having a low-sensitivity sensor or an image photographed under a condition of a low exposure less than an adequate exposure, the false-color-pixel detection-area determining unit obtains a reference-image luminance value of a portion corresponding to a white-saturated pixel in an image to be processed.

In addition, a second aspect of the present invention provides an image processing method. The image processing method includes:

a white-saturation detecting step of detecting a white saturated pixel from image data;

a false-color-pixel detection-area setting step of setting a false-color-pixel detection area around the white-saturated pixel detected in the white-saturation detecting step;

a false-color detecting step of identifying pixels having color corresponding to false color as false-color pixels in the area set in the false-color-pixel detection-area setting step; and a pixel-value correcting step of executing pixel-value correction processing, based on values of surrounding pixels, on the false-color pixels detected in the false-color detecting step.

Additionally, according to one embodiment of the present invention, the pixel-value correcting step has: a compensation interpolation step of executing compensation interpolation processing, based on the surrounding pixel values, on the false-color pixels; and a color blur processing step of executing color blur processing on the false-color pixels.

Additionally, according to one embodiment of the image processing apparatus of the present invention, the pixel-value correcting step is a step of selecting pixels other than false-color pixels and white-saturated pixels from pixels that exist around the false-color pixels and executing compensation interpolation processing based on the selected pixels.

Additionally, according to one embodiment of the image processing apparatus of the present invention, the false-color detecting step is a step of executing processing for identifying, as false-color pixels, pixels having preset specific color in the area set in the false-color-pixel detection-area setting step.

Additionally, according to one embodiment of the image processing apparatus of the present invention, the false color is purple fringe, and the false-color detecting step is a step of executing processing for identifying, as false-color pixels, purple pixels in the area set in the false-color-pixel detection-area setting step.

Additionally, according to one embodiment of the image processing apparatus of the present invention, the false-color-pixel detection-area setting step is a step of executing processing for determining the false-color-pixel detection area set around the white-saturated pixel detected in the white-saturation detecting step, in accordance with at least one piece of data of a diaphragm during photography of image data to be processed, focal distance information, and a distance from an optical center to a white-saturated pixel (x, y).

Additionally, according to one embodiment of the image processing apparatus of the present invention, the white-saturation detecting step is a step of executing processing for selecting a white-saturated pixel having a luminance higher than or equal to a predetermined threshold.

Additionally, according to one embodiment of the image processing apparatus of the present invention, the image processing method further has a color converting step of executing data conversion processing for separating input image data into luminance-component image data and color-component image data and of executing pixel-value correction processing based on the converted data generated by the color conversion unit.

Additionally, according to one embodiment of the image processing apparatus of the present invention, the false-colorpixel detection-area setting step having: a reference-image analyzing step of inputting a reference image in which a pixel at a position corresponding to a white-saturated pixel in an image to be processed does not have a saturation luminance value and obtaining a luminance value of the reference-image pixel corresponding to the white-saturated pixel in the image to be processed, the reference image being a photographed image of the same subject as the image to be processed; and a false-color-pixel detection-area determining step of setting a false-color-pixel detection area in accordance with the luminance value of the corresponding reference-image pixel, the luminance value being obtained in the reference-image analyzing step.

Additionally, according to one embodiment of the image processing apparatus of the present invention, the false-color-pixel detection-area determining step is a step of setting a false-color-pixel detection area by using a lookup table in which the luminance value of the reference image and a false-color generable pixel range or the false-color-pixel detection area are associated with each other.

Additionally, according to one embodiment of the image processing apparatus of the present invention, the false-color-pixel detection-area determining step is a step of executing processing for setting a wider false-color-pixel detection area as the luminance value of a corresponding pixel in the reference image increases.

Additionally, according to one embodiment of the image processing apparatus of the present invention, in the false-color-pixel detection-area determining step, an image photographed by an image capture device having a low-sensitivity sensor or an image photographed under a condition of a low exposure less than an adequate exposure is used as the reference image, and a reference-image luminance value of a position corresponding to a white-saturated pixel in an image to be processed is obtained.

In addition, a third aspect of the present invention provides a computer program for causing a computer to execute image processing. The program has:

a white-saturation detecting step of detecting a white saturated pixel from image data;

a false-color-pixel detection-area setting step of setting a false-color-pixel detection area around the white-saturated pixel detected in the white-saturation detecting step;

a false-color detecting step of identifying pixels having color corresponding to false color as false-color pixels in the area set in the false-color-pixel detection-area setting step; and a pixel-value correcting step of executing pixel-value correction processing, based on values of surrounding pixels, on the false-color pixels detected in the false-color detecting step.

Additionally, according to one embodiment of the present invention, the false-color-pixel detection-area setting step includes: a reference-image analyzing step of inputting a reference image in which a pixel at a position corresponding to a white-saturated pixel in an image to be processed does not have a saturation luminance value and obtaining a luminance value of the reference-image pixel corresponding to the white-saturated pixel in the image to be processed, the reference image being a photographed image of the same subject as the image to be processed; and a false-color-pixel detection-area determining step of setting a false-color-pixel detection area in accordance with the luminance value of the corresponding reference-image pixel, the luminance value being obtained in the reference-image analyzing step.

The computer program of the present invention can be supplied to, for example, a general-purpose computer system that can execute various program codes via a storage media, such as a CD, FD, or MO in a computer-readable format, or through a communication medium, such as a network. Supplying such a program in a computer-readable format can cause a computer to achieve processing according to the program.

Further objects, features, and advantages of the present invention will become apparent from more detailed description based on embodiments described below according to the present invention and the accompanying drawings. The term "system" herein refers to a logical combination of a plurality of apparatuses and is not limited to a system in which individual apparatus are included in the same housing.

According to the configuration of the present invention, a white-saturated pixel is detected from image data, a false-color-pixel detection area is set around the detected white-saturated pixel, pixels having color corresponding to false color such as purple fringe are detected from the set area, the detected pixels are determined as false-color pixels, and correction processing based on the values of the surrounding pixels is executed on the identified false-color pixels. Thus, it is possible to efficiently detect the area of false color, such as purple fringe, generated in the neighborhood of a white-saturated pixel and to partially correct the values of pixels. It is also possible to generate and output high-quality image data without affecting the entire image.

According to the configuration of the present invention, it is possible to perform appropriate correction on false color, such as purple fringe, caused by chromatic aberration occurred to an image photographed by a camera, and it is possible to achieve the generation and output of high-quality image data. With a conventional camera, there is a possibility that an unnatural image is photographed unless settings, such as a lens diaphragm, are adjusted in a situation in which purple fringe is generated. However, when the present invention is applied, it is possible to efficiently extract and correct false color, such as purple fringe, contained in a photographed image and it is possible to generate and output a high-quality image. Thus, there is no need to pay attention to the lens diaphragm and the focal distance such that purple fringing does not occur during photography, thus making it possible to perform photography with a higher degree of freedom.

In addition, according to the configuration of the present invention, a subject actual luminance corresponding a white-saturated pixel is estimated based on a reference image, a false color (purple fringe) detection area corresponding to the subject actual luminance is set, and false color (purple fringe) pixels in the set area are detected and corrected. Thus, a false color (purple fringe) detection area corresponding to an area in which false color (purple fringe) is likely to be generated can be set, without the set false color (purple fringe) detection area becoming too large or too small. False color (purple fringe) pixels can be reliably and efficiently detected, the accuracy of image correction is increased, and the efficiency is increased.

BRIEF DESCRIPTION OF THE DRAWINGS

FIG. 20 is a table showing an example of the structure of a lookup table (LUT) used in the processing for setting the false-color detection area in the second embodiment.

BEST MODE FOR CARRYING OUT THE INVENTION

Details of an image processing apparatus, an image processing method, and a computer program according to the present invention will be described below with reference to the accompanying drawings.

[First Embodiment]

Figure 1:
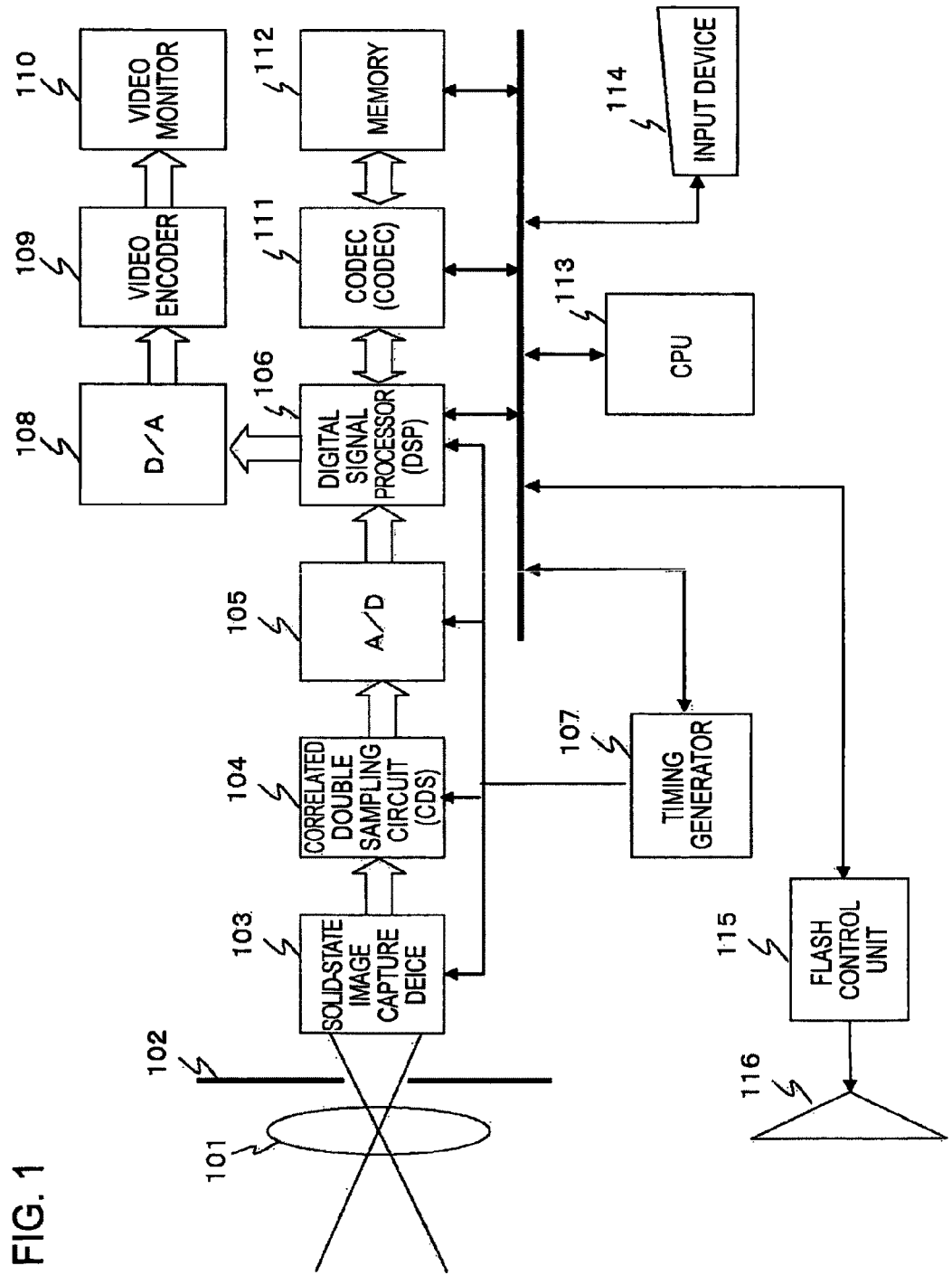
FIG. 1 is a diagram showing the configuration of an image processing apparatus of the present invention.

First, an example of the configuration of an image processing apparatus will be described with reference to FIG. 1. The image processing apparatus shown in FIG. 1 has an image capture unit and is illustrated as an example of an apparatus for executing correction processing on the data of an image captured by the image capture unit. However, for example, the image processing apparatus of the present invention can receive image data stored in a storage unit, such as a hard disk, and corrects the input image. The image processing apparatus can perform correction processing on not only image data input via the image capture unit but also various types of input image data, such as image data input via storing means or a network. FIG. 1 shows one example of the configuration of the image processing apparatus of the present invention.

A detailed configuration of the image processing apparatus shown in FIG. 1 will be described. As shown in FIG. 1, the image processing apparatus includes a lens 101, a diaphragm 102, a solid-state image capture device 103, a correlated double sampling circuit 104, an A/D converter 105, a DSP block 106, a timing generator 107, a D/A converter 108, a video encoder 109, a video monitor 110, a codec (CODEC) 111, a memory 112, a CPU 113, an input device 114, a flash control device 115, and a flash light emitting device 116.

The input device 114 herein refers to operation buttons and so on, such as a record button, provided on a camera main unit. The DSP block 106 is a block having a signal processor and an image RAM. The signal processor can perform pre-programmed image processing on image data stored in the image RAM. Hereinafter, the DSP block will simply be referred to as a "DSP".

The entire operation of the present embodiment will be described below.

Incident light that has reached the solid-state image capture device 103 through the optical system first reaches light receiving elements on the image-capture surface and is photoelectrically converted by the light receiving elements into an electrical signal. Noise of the electrical signal is eliminated by the correlated double sampling circuit 104 and the resulting signal is converted by the A/D converter 105 into a digital signal. Thereafter, the digital signal is temporarily stored in the image memory in the digital signal processor (DSP) 106. During photography, it is possible to cause the flash light emitting device 116 to emit light via the flash control device 115, when necessary.

While an image is captured, the timing generator 107 controls the signal processing system so as to maintain image-capturing at a constant frame rate. A stream of pixels is also sent to the digital signal processor (DSP) 106, in which appropriate image processing is performed. Thereafter, the resulting image data is sent to either or both of the D/A converter 108 and the codec (CODEC) 111. The D/A converter 108 converts the image data, sent from the digital signal processor (DSP) 106, into an analog signal and the video encoder 109 converts the analog signal into a video signal, which can then be monitored on the video monitor 110. This video monitor 110 serves as a camera finder in the present embodiment. The codec (CODEC) 111 encodes the image data sent from the digital signal processor (DSP) 106 and the encoded image data is stored in the memory 112. In this case, the memory 112 may be, for example, a storage device using a semiconductor, a magnetic storage medium, a magneto-optical storage medium, or an optical storage medium.

The entire system of a digital camera system has been described above as one example of the image processing apparatus of the present embodiment. Image processing according to the present invention, i.e., processing for correcting image data, is executed by the digital signal processor (DSP) 106. Details of the image processing will be described below.

A characteristic of how false color (purple fringe) is generated will be described first. The false color (purple fringe) refers to a phenomenon in which a color shift due to chromatic aberration noticeably appears around a white-saturated portion, and has a characteristic in that, for example, purple false color is generated. The size of an area where false color is generated around a white-saturated portion is associated with the type of optical system, the diaphragm of the optical system, and the focal distance, as well as a difference in luminance between a high-luminance portion and its surrounding portion, and also varies depending on the distance from the optical center. Also, a large amount of false color appears in a direction from the optical center toward the outside of a high-luminance pixel, in a direction from the high-luminance pixel toward the optical center, and so on. The tendency of the appearance varies depending on an optical system that performs image capture. In view of the characteristics described above, the present invention provides an image processing method for reducing purple fringing. The high-luminance pixel herein refers to a saturated pixel on an image and will hereinafter be referred to as a white-saturated pixel.

As described above, the typical phenomenon in which false color caused by lens aberration and generated at a high-contrast edge portion where white saturation, which is a state in which the luminance level is saturated, occurs is called "purple fringing". The false color is not limited to purple and may be green-tinted color. In the embodiment below, an example in which purple false color is generated will be described, but the present invention does not restrict the false color to purple and is applicable to processing for correcting false color having any color that is generated in the neighborhood of a white-saturated portion.

Figure 2:
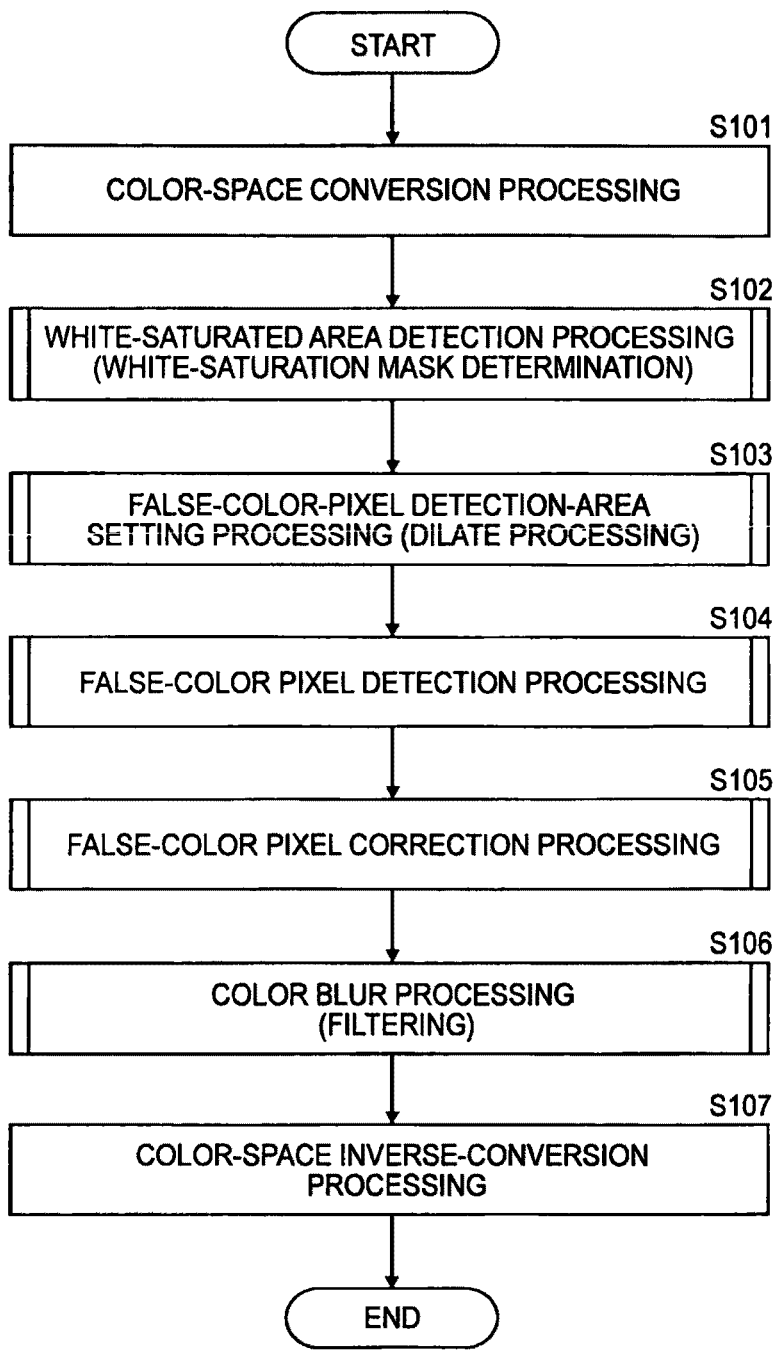
FIG. 2 is a flow chart illustrating the entire processing sequence of an image processing method of the present invention.

FIG. 2 is a flow chart showing the present embodiment. The outline of the entire processing will be described first and details of each process will be described later. Step S101 is color-space conversion processing, in which an input image is subjected to color-space conversion and is separated into a luminance component image and a color component image. Next, step S102 is white-saturated area detection processing, in which a white-saturated portion is detected from the input image data to be corrected. Step S103 is a false-color-pixel detection-area setting processing, in which a search area for purple pixels, which are false-color pixels generated around a white-saturated portion, is set. Further, step S104 is false-color pixel detection processing, in which purple pixels in the search area are detected. Step S105 is false-color pixel correction processing, in which the color components of the detected purple pixels are corrected. Further, step S106 is color blur processing (filter processing), in which filter processing is performed to provide a result that looks natural. Lastly, step S107 is color-space inverse-conversion processing, in which the luminance component image and color component image of the corrected result are converted and the resulting image is output as an RGB color image.

The input image is the data of an image captured by an image capture unit, for example, in the system having the image capture unit shown in FIG. 1 and is data input to the digital signal processor (DSP) 106 as digital data. As described above, the input image data may be image data stored in a storage medium or data input from another apparatus through a network.

Figure 3:
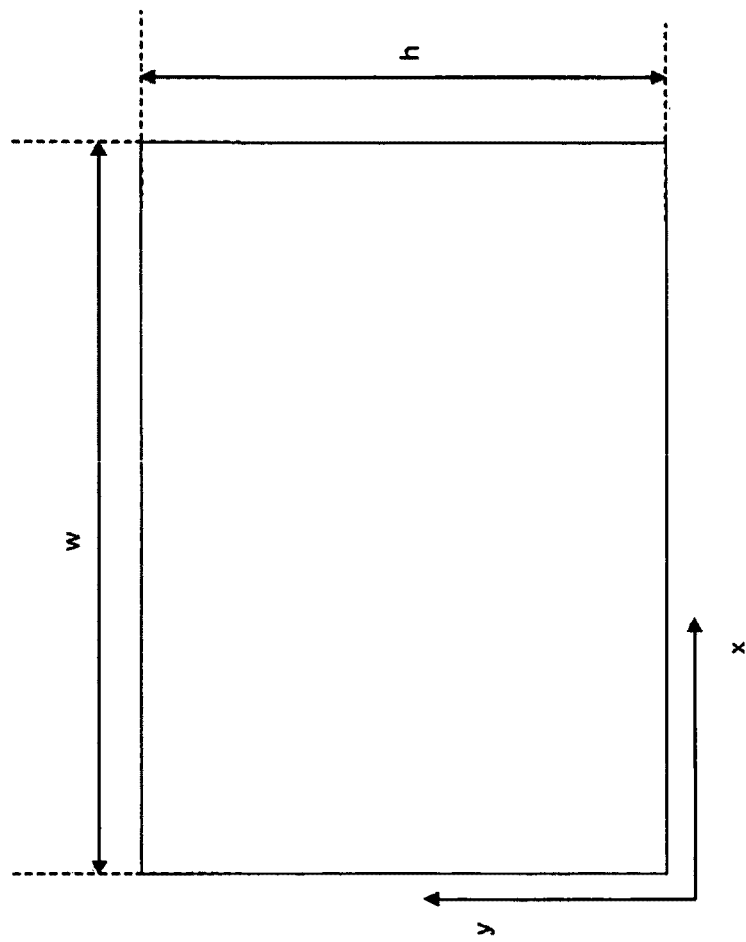
FIG. 3 is a diagram illustrating the configuration of image data to be corrected by the image processing apparatus of the present invention.

In the present embodiment, the input image to be processed is referred to as $RGB_{in}$. $RGB_{in}$ is an image having color information in each pixel and is obtained by performing demosaic processing and white-balance processing on data output from the solid-state image capture device of a camera. With $RGB_{in}$ of an input image to be processed, as shown in FIG. 3, the number of pixels (width) in the x direction of the input image $RGB_{in}$ is indicated by w and the number of pixels (height) in the y direction is indicated by h. Each step will be described below in detail.

First, in the color-space conversion processing in step S101, the input image $RGB_{in}$ is converted and is separated into a luminance component image $L_{in}$ and a color component image $C_{in}$. That is, the input RGB-color image is converted into color-space data having luminance components and color-space data having color components. For example, YCbCr or CIE L*a*b* can be used for the color space of the converted data.

Figure 4:
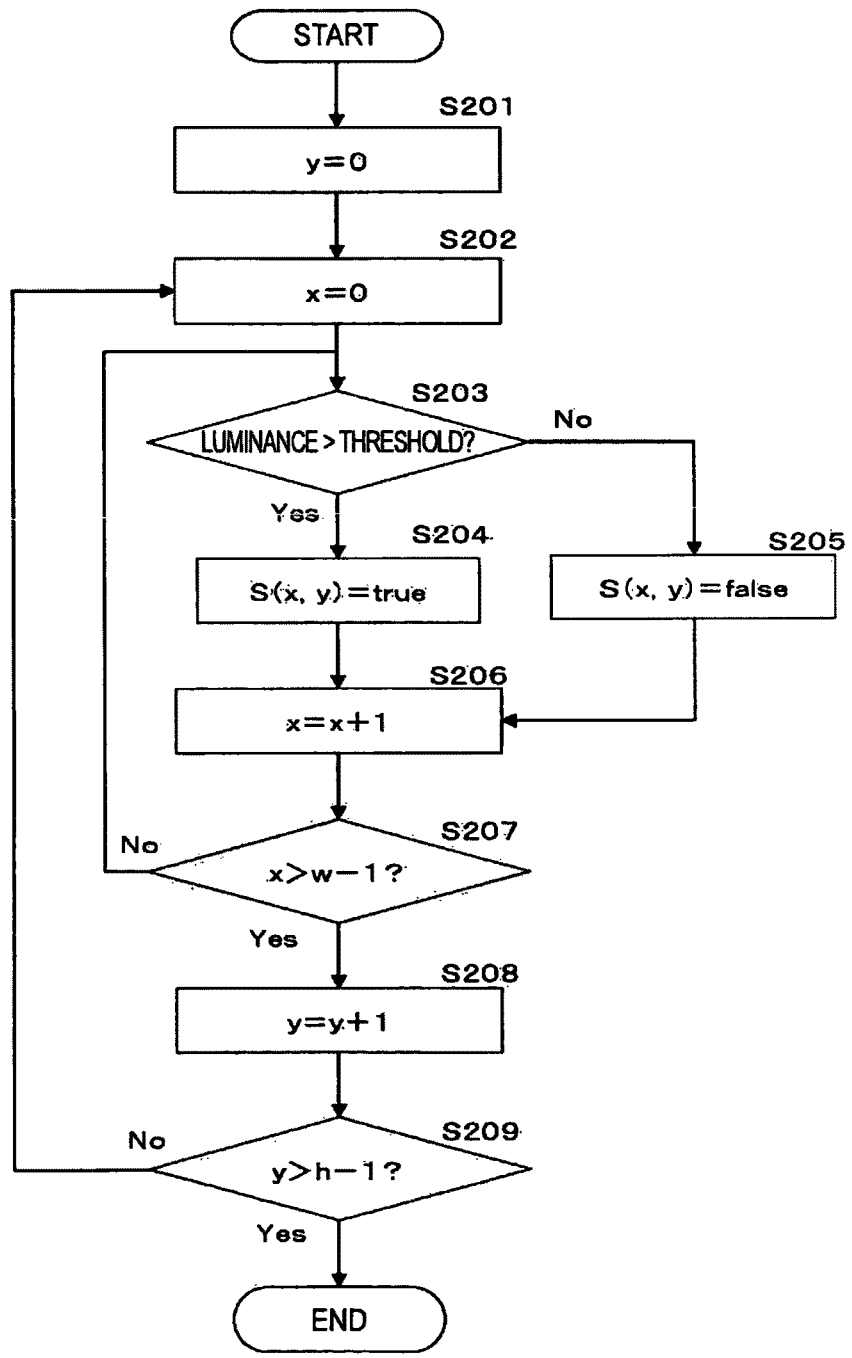
FIG. 4 is a detailed sequence of a white-saturated-area detection processing executed in the image processing of the present invention.

Next, in the white-saturated area detection processing in step S102, white-saturated area detection processing (white-saturation mask determination) based on the converted image data is executed. That is, white saturated pixels are detected from the image data and a white saturation mask S, which is a binary image, is generated. Details of the white-saturated pixel detection processing executed in step S102 will be described with reference to FIG. 4.

In steps S201 and S202, of the image data to be corrected, the position of a pixel to be inspected is initiated. In the initialization, the position of a pixel to be inspected is set as x=0 and y=0. In step S203, a determination is made as to whether or not the luminance of a pixel (x, y) having the luminance component image $L_{in}$ is higher than or equal to a predetermined threshold. When the luminance is higher than or equal to the threshold, the process proceeds to step S204, in which the white-saturation mask S (x, y) is set to true. When the luminance is lower than or equal to the threshold, the process proceeds to step S205, in which the white-saturation mask S (x, y) is set to false.

In step S206, the pixel position x is updated. In step S207, a determination is made as to whether or not x reaches a maximum value (x=w). When x does not reach the maximum value, step S203 and the subsequent steps are repeatedly executed. When x reaches the maximum value (x=w) in step S207, the process proceeds to step S208, in which the pixel position y is updated. In step S209, a determination is made as to whether or not y reaches a maximum value (y=h). When y does not reach the maximum value, step S202 and the subsequent steps are repeatedly executed. When processing on all pixels (x=0 to w, y=0 to h) is finished, the generation of the white saturation mask is finished.

As a result, a white-saturation mask that distinguishes between a pixel area having a luminance level higher than the threshold and a pixel area having a luminance area equal to or less than the threshold is generated for each pixel position. When luminance levels of 0 (dark) to 255 (bright) are set, the threshold is set to, for example, about 250 and pixels having luminance levels higher than or equal to 250 are extracted as white-saturated-generated pixels and a white saturation mask that can distinguish only those pixels is generated.

Through the processing described above, step S102 shown in FIG. 2 is finished. Next, the false-color-pixel detection-area setting processing in step S103 is executed. In this processing, search-area setting (dilate) processing for a false-color-generated portion around a white-saturated portion is executed. In this case, a mask P for distinguishing a search area for a false-color-generated portion around a white-saturated portion, i.e., a mask P representing a search area for purple pixels around a white-saturated portion, is generated. P is a binary mask image.

Details of the false-color-generated-portion search-area setting processing in step S103 will be described with reference to FIG. 5. First, in step S301, all pixels of the false-color area mask P are initialized to false. Next, in steps S302 and S303, the pixel position is initialized. In the initialization, the pixel position is set as x=0 and y=0.

After the pixel position is set, in step S304, the pixel value of the white saturation mask S for the set pixel position is determined. When the white saturation mask S (x, y) is false for the set pixel position (x, y), the process proceeds to step S314 for the processing on a next pixel. If S (x, y) is true, the process proceeds to step S305. When the white-saturation mask S (x, y) is false for the pixel position (x, y), this means that the pixel value of the pixel poison (x, y) indicates a non white-saturated pixel. When the white-saturation mask S (x, y) is true for the pixel position (x, y), this means that the pixel value of the pixel poison (x, y) indicates a white-saturated pixel.

When the white saturation mask S (x, y) is true for the pixel position (x, y), in step S305, an area in which false color can be generated around the white saturated pixel (x, y) is determined. As described above, purple fringing occurs around a white-saturated portion, and an area in which purple fringing can occur changes depending on the type of optical system, the setting of a diaphragm/focal distance, and a difference in luminance between a high-luminance pixel and its surrounding pixels. The area in which the purple fringing can occur also changes depending on the distance from the optical center on an image. The information of the type and setting of the optical system can be stored during photography so as to be used for image processing. The positional relationship between a white-saturated portion and the optical center portion can be easily determined.

For example, based on the characteristics of the optical system of the image capture system, pre-set false-color-pixel detection-area determination information, such as a lookup table (LUT) containing a false-color-pixel detection area corresponding to an image area, is used in the present embodiment. For example, the lookup table (LUT) has a structure that is capable of outputting, as input parameters, false-color detection area information, such as the distance from the optical center on an image to a white-saturated pixel (x, y), the diaphragm during photography of image data, and focal distance information.

The diaphragm and focal distance information during photography of image data is obtained from the attribute information of the image data and the pixel position information set as information to be inspected in this flow is used for the distance from the optical center on the image to the white saturated pixel (x, y).

When the attribute information, such as the diaphragm and focal distance information during photography of image data, cannot be obtained, a false-color-pixel detection area may be determined based on only the distance from the optical center on the image to the white saturated pixel (x, y). Also, a certain area around the white-saturated pixel (x, y) may be automatically set as the false-color-pixel detection area, without the use of the information, such as the distance from the optical center to the white-saturated pixel (x, y).

Figure 6:
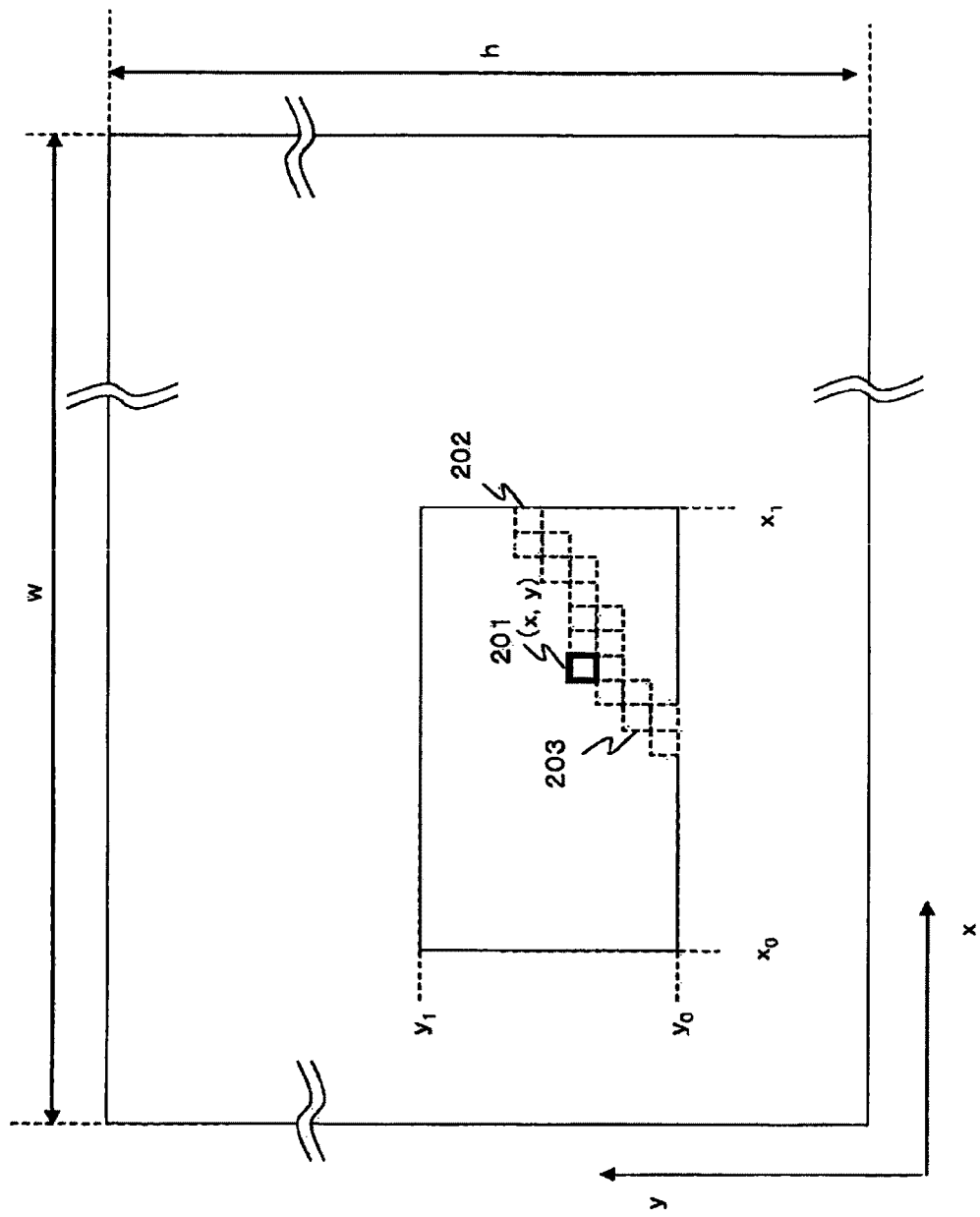
FIG. 6 is a diagram illustrating a processing example of the false-color-pixel detection-area setting processing executed in the image processing of the present invention.

In step S305, the range of the false-color-pixel detection area around the white saturated pixel (x, y) is determined as four scalar values ($x_0$, $x_1$, $y_0$, $y_1$). In this determination, as shown in FIG. 6, a rectangle area defined by $x_0$ to $x_1$ and $y_0$ to $y_1$ around a saturated white pixel (x, y) 201 is determined as the false-color-pixel detection area 202. Pixels 203 indicated by dotted lines in FIG. 6 are white saturated pixels 203 other than the white saturated pixel (x, y) 201 of interest.

Next, with respect to the determined false-color-pixel detection area ($x_0$, $x_1$, $y_0$, $y_1$), a point expressed by i=$x_0$ and j=$y_0$ is set as the origin (in steps S306 and S307). In steps S308 to S312, a determination is made as to whether the value of the white saturation mask S (i, j) is true or false with respect to each pixel in the false-color-pixel detection area ($x_0$, $x_1$, $y_0$, $y_1$). With respect to the pixels included in the false-color-pixel detection area 202 shown in FIG. 6, a determination is sequentially made as to whether the value of the white saturation mask is true or false. In FIG. 6, with respect to the white saturated pixel (x, y) of interest 201 and the white saturated pixels 203, it is determined that the white saturation mask S (i, j) is true.

When it is determined in step S308 that the white saturation mask S (i, j) is true, the process proceeds to step S310, in which processing on a next pixel is performed. When the white saturation mask S (i, j) is false, the process proceeds to step S309, in which the value of the false-color area mask P (i, j) is set to true. Thereafter, the process proceeds to step S310, in which processing on a next pixel is performed. Steps S310 to S313 include processing for updating the values of i and j and processing for determining whether maximum values i=$x_1$ and j=$y_1$ are satisfied. While the values of i and j are sequentially updated, the value of the false-color area mask P (i, j) set around the specific pixel (x, y) is determined.

The false-color mask P (i, j)=true indicates that the pixel in question belongs to the false-color-pixel detection area and is not a white saturated pixel. The false-color area mask P (i, j)=false indicates that the pixel in question does not belong to the false-color-pixel detection area or is a white saturated pixel.

When it is determined in step S313 that the processing on all pixels (i, j) in the false-color-pixel detection area ($x_0$, $x_1$, $y_0$, $y_1$) is completed, the process proceeds to step S314. Steps S314 to S317 include processing for updating the values of x and y and processing for determining whether the maximum values x=w and y=j are satisfied. While the values of x and y are sequentially updated, the values of the false-color area mask P (i, j) are determined with respect to all pixels in the image (x=0 to w and y=0 to h) to be processed and the false-color area mask P (i, j) is generated. When it is determined that all pixels (x, y) in the image have been processed, the false-color-pixel detection-area setting processing in step S103 shown in FIG. 2 is finished.

The next processing is the false-color pixel detection processing in step S104 shown in FIG. 2. In step S103, although false color around a white-saturated portion, i.e., an area in which purple fringe can be generated in an image, is determined using the false-color area mask P, processing for detecting a pixel that is actually assumed to have purple fringe is performed in next step S104. That is, pixels that are actually assumed to have purple fringe are detected from pixels in an area that satisfies the false-color area mask P=true.

In step S104, the false-color area mask P is updated by overwriting the false-color area mask P calculated in step S103 to thereby generate a false-color area mask P that allows identification of only pixels ultimately determined to have false color. Details of the false-color pixel detection processing in step S104 will be described with reference to FIG. 7.

In steps S401 and S402, the image-data pixel position is initialized. In the initialization, the pixel position is set as x=0 and y=0. In step S403, the value of the false-color area mask P for the pixel position (x, y) is determined. For P (x, y)=false, the process proceeds to step S406. For P (x, y)=true, the process proceeds to step S404.

As described above, the false-color area mask P (i, j)=true indicates that the pixel in question belongs to the false-color-pixel detection area and is not a white saturated pixel. The false-color area mask P (i, j)=false indicates that the pixel in question does not belong to the false-color-pixel detection area or is a white saturated pixel.

When the pixel position (x, y) satisfies the false-color area mask P (i, j)=true, i.e., the pixel in question belongs to the false-color-pixel detection area and is not a white-saturated pixel, a determination is made in step S404 as to whether or not the color of a color component image $C_{in}$ at the position (x, y) is color corresponding to false color. For example, a determination is made as to whether the color is the purple of purple fringing.

Figure 8:
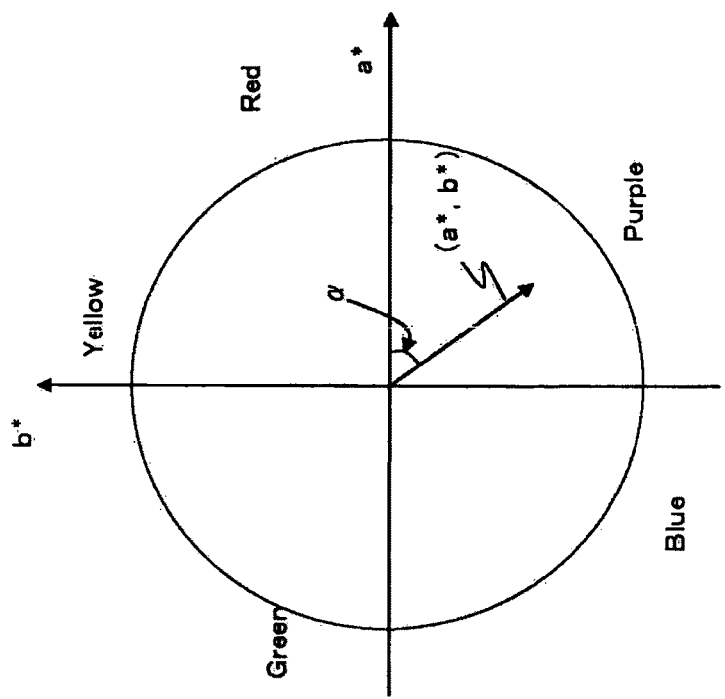
FIG. 8 is a diagram illustrating a processing example (a case in which CIE L*a*b* is used) of the false-color-pixel detection processing executed in the image processing of the present invention.

The method for determining whether or not the color component image $C_{in}$ (x, y) is color corresponding to false color, for example, purple, varies depending on the converted color space. One example of the determination method when, for example, CIE L*a*b* is used for the color space will be described with reference to FIG. 8. The color components are determined using component a* and component b*. The CIE L*a*b* has a characteristic as follows. When the value of component a* increases, the color approaches red (Red), and when the value of component a* decreases, the color approaches green (Green). When the value of component b* increases, the color approaches yellow (Yellow), and when the value of component b* decreases, the color approaches blue (Blue). Thus, when (a*, b*) exists in the fourth quadrant, it has color close to purple (Purple). Whether the color is purple or not is determined using an angle α formed by the vector (a*, b*) and the axis a*.

The angle range for purple that is determined to be false color is appropriately set as a parameter. Alternatively, a predetermined value is used for the angle range. The color saturation of a false color (purple fringe) portion pixel tends to be high. Thus, only when the above described conditions are satisfied and the color saturation of the color component $C_{in}$ is higher than or equal to a preset threshold, it may be determined as false color (purple fringe).

The method for determining whether or not the color component image $C_{in}$ (x, y) is color corresponding to false color, for example, purple, varies depending on the converted color space. Processing for a case in which YCbCr is used for the color space will be described next. In this case, the color component is determined using component Cb and component Cr. Since Cb=128 and Cr=128 indicate achromatic color in the YCbCr space, color represented by Cb and Cr is expressed by (Cb−128, Cr−128). For example, an angle expressed by θ for (Cb−128, Cr−128)=(a×cos θ, a×sin θ) is used as a hue. Whether or not the color component image $C_{in}$ (x, y) is color corresponding to false color is determined by, for example, determining whether the angle θ is in a pre-specified range.

Figure 9:
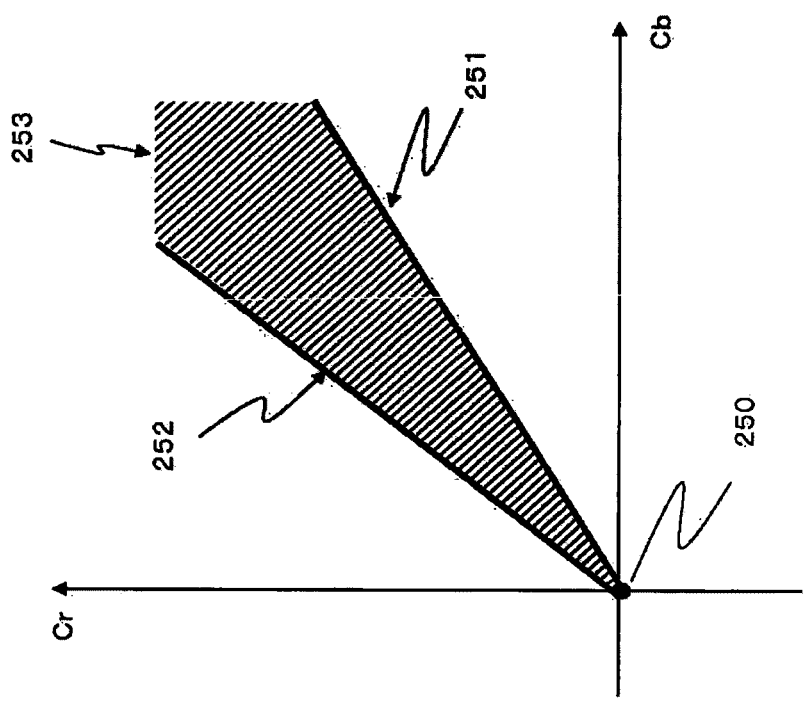
FIG. 9 is a diagram illustrating a processing example (a case in which YCbCr is used) of the false-color-pixel detection processing executed in the image processing of the present invention.

Processing for determining whether $C_{in}$ (x, y) has a hue that is in a pre-specified hue range, i.e., has a hue that is in a hue range corresponding to false color, such as purple fringe (PF), in a configuration using YCbCr is described with reference to FIG. 9. FIG. 9 is a plot showing a purple-fringe (PF) hue range in the color space. CbCr corresponding to color information when the YCbCr space is used as one example of the color space is two-dimensionally plotted in FIG. 9. The horizontal axis indicates the value of Cb and the vertical axis indicates the value of Cr. An origin 250 has color corresponding to Cb=128 and Cr=128.

As the method for specifying a hue range corresponding to purple fringe (PF), a method for determining whether or not a hue in question is in the range of two color hues is used. The purple fringe has purple, and this specific hue range is set in a two-dimensional CbCr coordinate space shown in FIG. 9. An area between a hue line 251 and a hue line 252 shown in the figure is set as an area indicating a hue range 253 corresponding to purple fringe (PF).

Whether $C_{in}$ (x, y) is color corresponding to false color can be determined based on whether or not $C_{in}$ (x, y) is included in the hue range 253 shown in FIG. 9.

The angle range for purple that is determined to be false color is appropriately set as a parameter. Alternatively, a predetermined value is used for the angle range. The color saturation of a false color (purple fringe) portion pixel tends to be high. Thus, only when the above described conditions are satisfied and the color saturation of the color component $C_{in}$ is higher than or equal to a preset threshold, it may be determined as false color (purple fringe). In this manner, when it is determined that $C_{in}$ (x, y) is a false color (purple fringe) pixel, the process proceeds to step S406. When it is determined that $C_{in}$ (x, y) is not false color (purple fringe), the process proceeds to step S405.

In step S405, the false-color area mask P (x, y) is set to false, and the process proceeds to step S406. That is, a pixel that has been determined, as the false-color area mask P (x, y)=true, to be likely to have false color in the above-described processing in step S103 (FIG. 2) is ultimately determined as not having false color, and based on this final determination, it is changed (updated) to the false-color area mask P (x, y)=false.

Figure 7:
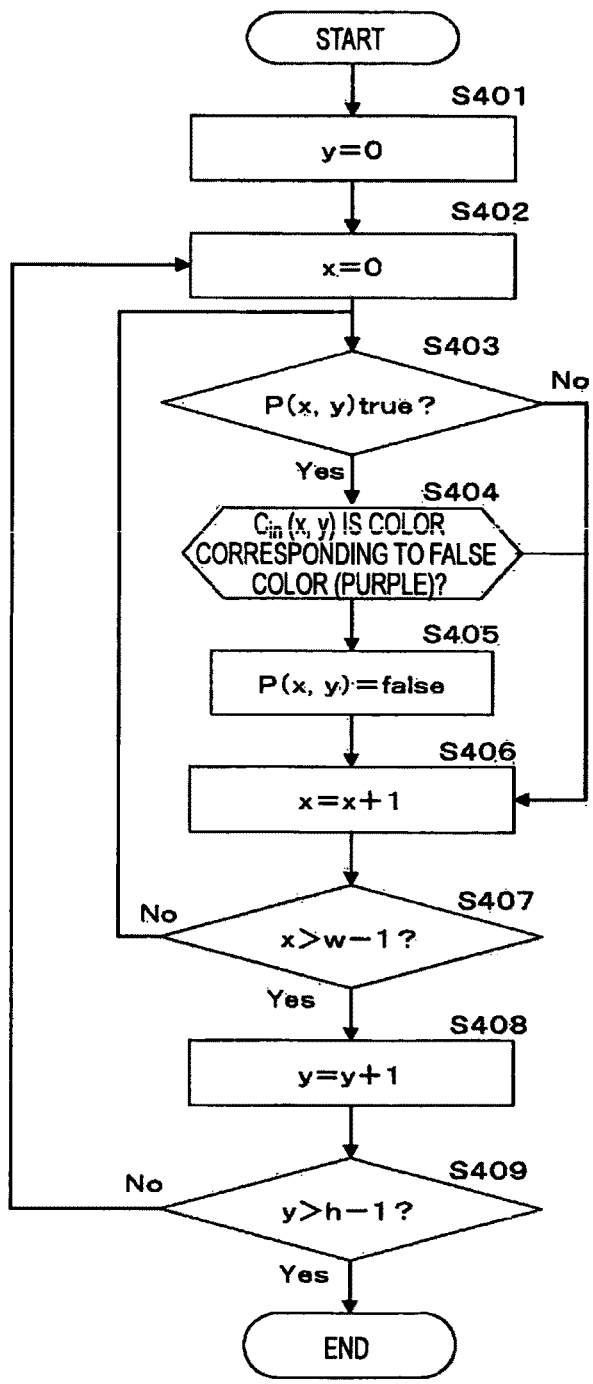
FIG. 7 is a flow chart illustrating a detailed sequence of a false-color-pixel detection processing executed in the image processing of the present invention.

That is, in the processing illustrated in FIG. 7, only pixels that have ultimately been determined to have false color by the color determination are sorted from pixels that are determined to be likely to have false color by the above-described processing in step S103 (FIG. 2) and the false-color area mask P (x, y) is updated.

Steps S406 to S409 include processing for updating the values of x and y and processing for determining whether the maximum values x=w and y=h are satisfied. While the values of x and y are sequentially updated, the values of the false-color area mask P (i, j) are determined with respect to all pixels in the image (x=0 to w and y=0 to h) to be processed and the false-color area mask P (i, j) is generated. When it is determined that all pixels (x, y) in the image have been processed, the false-color pixel detection processing in step S104 shown in FIG. 2 is finished.

The false-color pixel correction processing in step S105 shown in FIG. 2 will be described next. In step S104, as described above, the false-color area mask P for identifying a pixel determined to have false color (purple fringe) has been generated. In next step S105, processing for interpolating the color of a pixel determined to have false color (purple fringe) is executed by compensation repetition processing based on the pixel values of its surrounding pixels. The "compensation" processing herein refers to sequential repetition of the false-color-pixel interpolation processing based on the pixel values of surrounding pixels.

Figure 10:
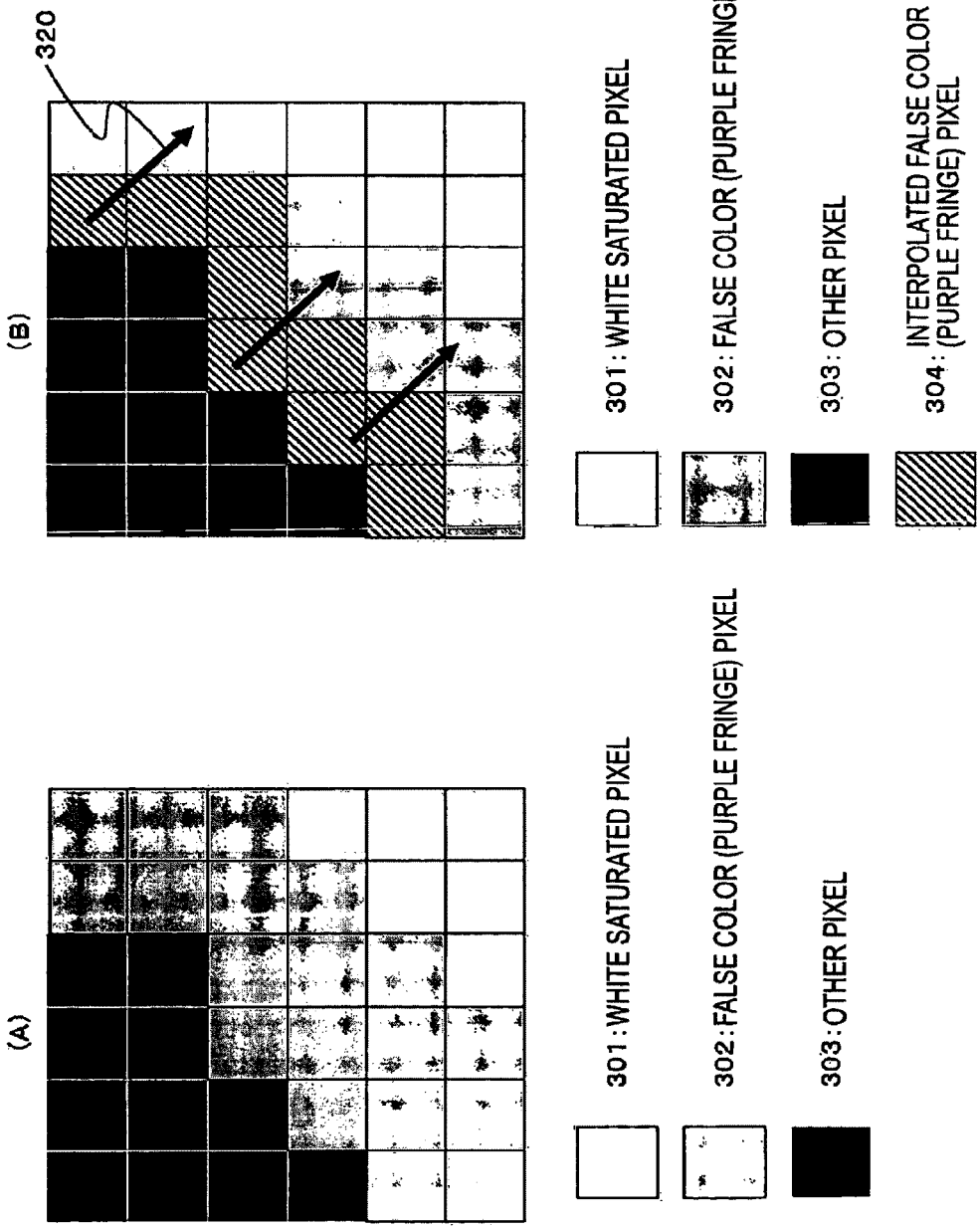
FIG. 10 includes diagrams illustrating a processing example of a false-color-pixel correction processing executed in the image processing of the present invention.

FIGS. 10(A) and 10(B) are schematic views illustrating the false-color pixel correction processing in step S105 shown in FIG. 2. As shown in FIG. 10(A), all pixels in the processing until step S104 are classified into any of a "white saturated pixel 301", a "false color (purple fringe) pixel 302", and a "pixel 303 that is neither a white-saturated nor purple-fringe pixel".

In the first step of the compensation repetition processing, each pixel in the image is scanned. If a false color (purple fringe) pixel 302 (position (x, y)) is in the neighborhood of pixels 303 that are neither white-saturated nor purple-fringe pixels, for example, if pixels 303 exist in the surrounding eight neighborhood pixels, the average value of the pixel color components C of the neighborhood pixels 303 is set as a new pixel color component C (x, y).

In this manner, the processing for setting the pixel value of a false color (purple fringe) pixel 302 based on the other pixels 303 is performed on all pixels once. As a result, as shown in FIG. 10(B), the color components of the false color (purple fringe) pixels 302 in the neighborhood of the other pixels 303 are interpolated and the false color (purple fringe) pixels 302 are set as interpolated false color (purple fringe) pixels 304.

In addition, in the next compensation repetition processing, the color components of the false color (purple fringe) pixels 302 in the neighborhood of the other pixels 303 or the interpolated false color (purple fringe) pixels 304 are similarly interpolated based on the other pixels 303 and the interpolated false color (purple fringe) pixels 304. Such repetition processing is repeated a fixed number of times. In this processing, the false color (purple fringe) pixels 302 are sequentially set as the interpolated false color (purple fringe) pixels 304 in a direction indicated by arrows 320 shown in FIG. 10(B). After the fixed number of repetitions of such repetition processing is performed, even if false color (purple fringe) pixels 302 whose color components have not been interpolated exist, it is determined that the color interpolation using their surrounding pixels is impossible and the processing for uniformly reducing the color saturation of color of those pixels is performed.

In this manner, the false-color pixel correction processing in step S105 shown in FIG. 2 is compensation repetition processing, that is, processing for setting the pixel values of pixels, determined to have false color (purple fringe) in step S104, based on pixels other than surrounding white-saturated pixels. Color-saturation reduction processing is performed on remaining false color (purple fringe) pixels 302 that are not interpolated by the above-described processing.

Details of the false-color pixel correction processing in step S105 will be described with reference to processing flows shown in FIGS. 11 and 12. In the processing flows in FIGS. 11 and 12, processing in steps S501 to S515 shown in FIG. 11 is processing for compensating the color components of false color (purple fringe) pixels and processing in steps S516 to S523 shown in FIG. 12 is processing for reducing the color saturation of pixels that have not been compensated.

Figure 11:
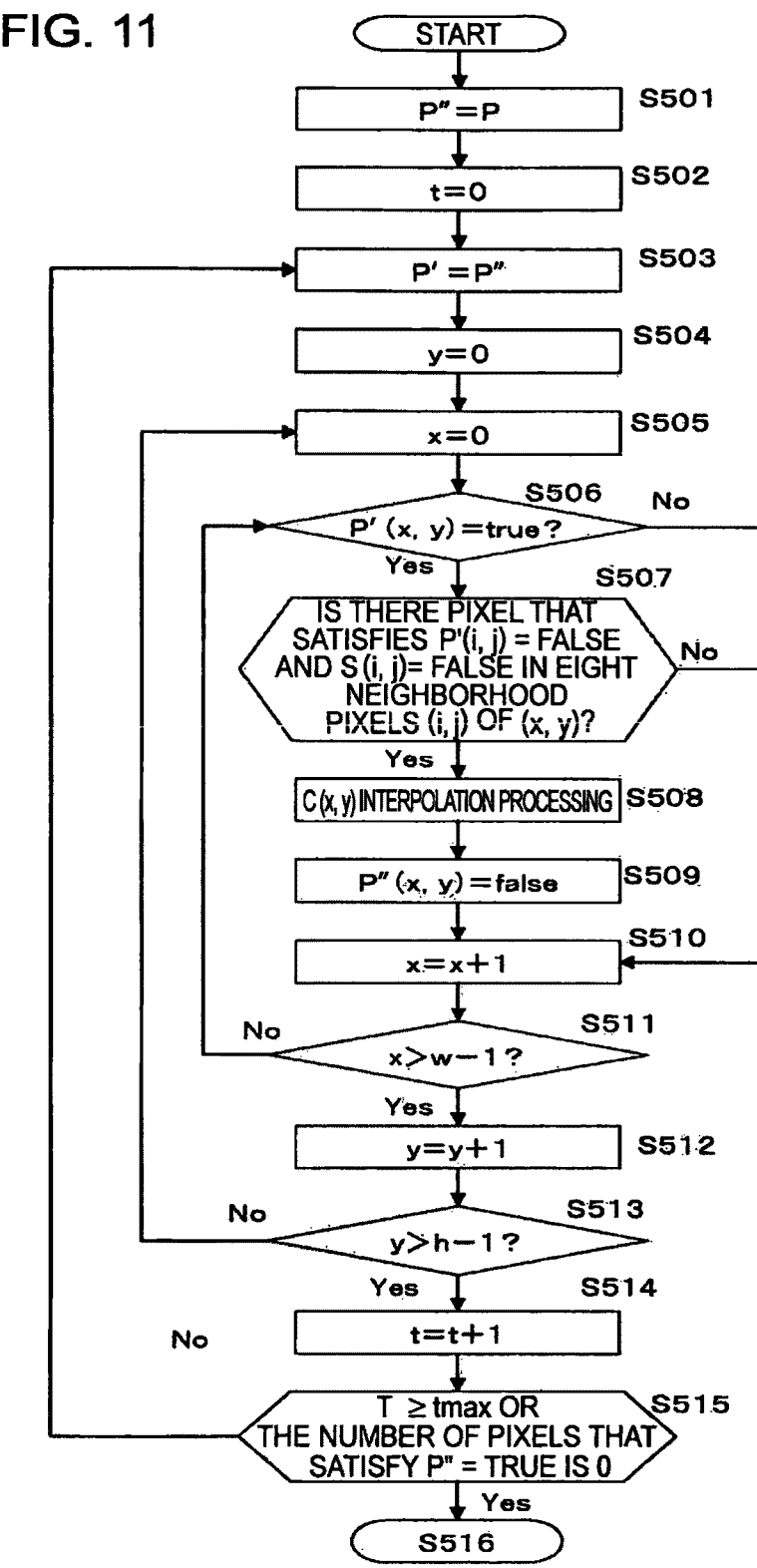
FIG. 11 is a flow chart illustrating a detailed sequence of a false-color-pixel correction processing executed in the image processing of the present invention.
Figure 12:
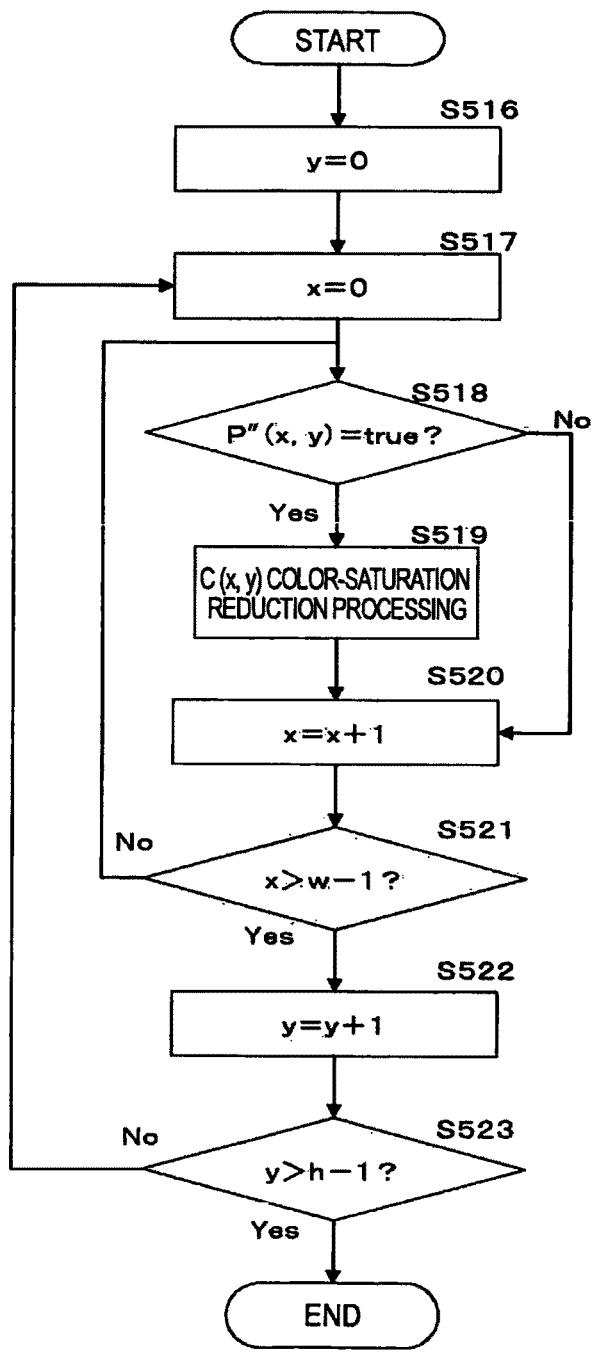
FIG. 12 is a flow chart illustrating a detailed sequence of the false-color-pixel correction processing executed in the image processing of the present invention.

Descriptions will sequentially be given from FIG. 11. First, in step S501, the content of the false-color area mask P generated in the false-color pixel detection processing in step S104 shown in FIG. 2 is copied onto a binary mask P''' having substantially the same size. Examples include:

False-color area mask P=true→Binary mask P'''=true (1)
False-color area mask P=false→Binary mask P'''=false (0)

In step S502, the value of variable t indicating the number of repetitions of the compensation processing is set to 0. In step S503, the value of the binary mask P''' is copied onto another binary mask P' having substantially the same size. These masks P''' and P' are temporary mask images used for storing the position of the false color (purple fringe) pixels 302 that decrease by the repetition processing.

Next, in steps S504 and S505, variables x and y indicating the position coordinates of a pixel to be processed are initialized to satisfy x=0 and Y=0. Next, in step S506, the value of the binary mask P' (x, y) is determined. For the binary mask P' (x, y)=false, that is, when a pixel to be processed is not a false-color pixel, the process proceeds to S510. For the binary mask P' (x, y)=true, that is, when a pixel to be processed is a false-color pixel, the process proceeds to S507.

In step S507, a determination is made as to whether or not a pixel that satisfies the binary mask P'=false and the white-saturation mask S=false exists in pixels in the neighborhood of the pixel (x, y). That is, a determination is made as to whether a pixel that is neither a false-color pixel nor a white-saturated pixel exists. When it is determined that a pixel that satisfies such conditions does not exist in the pixels in the neighborhood of the pixel (x, y), the process proceeds to step S510.

When it is determined that a pixel that is neither a false-color pixel nor white-saturated pixel exists in the pixels in the neighborhood of the pixel (x, y), the process proceeds to step S508. In step S508, the average value of color components C of one or more pixels that satisfy the binary mask P'=false and the white-saturation mask S=false, that is, that are neither false-color pixels nor white-saturated pixels, and that are in the neighborhood of the pixel (x, y) is determined and is set for the color component C (x, y) of the coordinate (x, y). That is, the determined average value is set as the pixel value of the pixel (x, y). With this interpolation processing, the interpolated false color (purple fringe) pixels 304 shown in FIG. 10(b) are set.

After this processing, the process proceeds to step S509. In step S509, the value of the binary mask P''' (x, y) is set to false. That is, on the binary mask P''' (x, y), pixels that have been changed from false-color pixels to interpolated false-color pixels are set to be identifiable as pixels that are not false color pixels.

Steps S510 to S513 include processing for updating the coordinates of a pixel to be processed and processing for determining the maximum values. In step S510, the value of the x coordinate is increased by 1. Next, in step S511, a determination is made as to whether x>w−1 is satisfied (w is the width of an input image). When it is determined that x>w−1 is satisfied, the process proceeds to step S512. When it is determined that x>w−1 is not satisfied, the process proceeds to step S506.

In step S512, the y coordinate is increased by 1. Next, in step S513, the y coordinate is compared with h−1, which is the maximum value of the y coordinate (h is the height of the input image). When it is determined that y>h−1 is satisfied, the process proceeds to step S514. When it is determined that y>h−1 is not satisfied, the process proceeds to step S505.

In step S514, t indicating the number of repetitions is increased by 1. In step S515, a determination is made as to whether the number t of repetitions is predetermined value tmax or more. Simultaneously, with respect to the mask image P''', a determination is made as to whether the number of pixels having a value of true is 0. That is, a determination is made as to whether or not the number of false-color pixels that have not been completely interpolated by the compensation interpolation processing is 0. When it is determined that any of the above-described two conditions is true, the process proceeds to step S516. When it is determined that both of the conditions are false, the process returns to step S503 and the compensation processing is performed again.

In step S515, when it is determined to be true in either of the processing for determining whether the number t of repetitions reaches the predetermined value tmax or more and the processing for determining whether the number of false-color pixels that have not been completely interpolated by the compensation interpolation processing is 0, the process proceeds to step S516 shown in FIG. 12.

In steps S516 and S517, variables x and y indicating the coordinates of a pixel to be processed are initialized to satisfy x=0 and Y=0. Next, in step S518, a determination is made as to whether the value of the binary mask P''' for (x, y) is true. That is, a determination is made as to whether or not a pixel to be processed is a false-color pixel. For the binary mask P''' (x, y)=true, i.e., for a false-color pixel, the process proceeds to step S519. For the binary mask P''' (x, y)=false, i.e., for a non-false-color pixel, the process proceeds to step S520.

When the pixel to be processed is a false-color pixel, the color-saturation reduction processing for reducing the color saturation of color components C (x, y) of the pixel (x, y) is performed in step S519. For example, when an L*a*b* color system is used, the color saturation can be uniformly reduced by multiplying the value of each component of a* and b* by a constant in the range of 1.0 to 0.0. When the color-saturation reduction processing in step S519 is finished, the process proceeds to step S520. In step S520, the value of the x coordinate is increased by 1. Next, in step S521, a determination is made as to whether x>w−1 is satisfied. When it is determined that x>w−1 is satisfied, the process proceeds to step S522. When it is determined that x>w−1 is not satisfied, the process proceeds to step S518 and similar processing is repeated on a neighborhood pixel for which the x coordinate has been updated.

In step S521, when it is determined that x>w−1 is satisfied, the maximum value of the x coordinate is reached and thus the process proceeds to step S522, in which the y coordinate is increased by 1. In next step S523, the y coordinate is compared with h−1, which is the maximum value of the y coordinate. When y>h−1 is not satisfied, the process proceeds to step S517, and similar processing is repeated on a pixel having an updated y coordinate. When it is determined that y>h−1 is satisfied in step S523, the false-color pixel correction processing is finished. With the processing described above, the false-color pixel correction processing in step S105 shown in FIG. 2 is finished.

When the false-color pixel correction processing in step S105 is finished, the color blur processing (filtering) in step S106 is executed next. In step S105, the color of false color (purple fringe) pixels was interpolated by repeating the compensation processing and false color (purple fringe) pixels that had not been compensated were subjected to the processing for reducing the color saturation. However, a portion whose color changes relatively quickly can exist in a false color (purple fringe) portion subjected to the processing in step S105. In the color blur processing (filtering) in step S106, processing for applying a blur filter is performed to reduce the quick color change.

Details of the color blur processing (filtering) in step S106 will be described with reference to processing flow shown in FIG. 13. First, in step S601, the value of variable t indicating the number of repetitions of the color blur processing (filtering) is set to 0. Next, in step S602, the color component image C updated by the false-color-pixel correction processing in step S105 described above is copied onto a color component image C' having substantially the same size.

Next, in steps S603 and S604, variables x and y indicating the coordinates of a pixel to be processed are initialized to satisfy x=0 and Y=0. Next, in step S605, the value of the false-color area mask P (x, y) is determined. For the false-color area mask P (x, y)=false, i.e., for a non-false-color pixel, the process proceeds to S607. For the false-color area mask P (x, y)=true, i.e., for a false-color pixel, the process proceeds to step S606.

The false-color area mask P (x, y) is a mask set to true for a pixel determined to have false color based on the color (pixel value) determination in the false-color-pixel detection processing (corresponding to the processing flow in FIG. 7) in step S104 described above. The false-color area mask P (x, y) is mask data that maintains the value "true" for a false-color pixel area corrected by the false-color pixel correction pixel processing in step S105 described above. Since the false-color area mask P (x, y) is used for the color blur (filtering) processing, the copy mask P''' of the false-color area mask P (x, y) is used for the false-color pixel correction processing in step S105.

Figure 13:
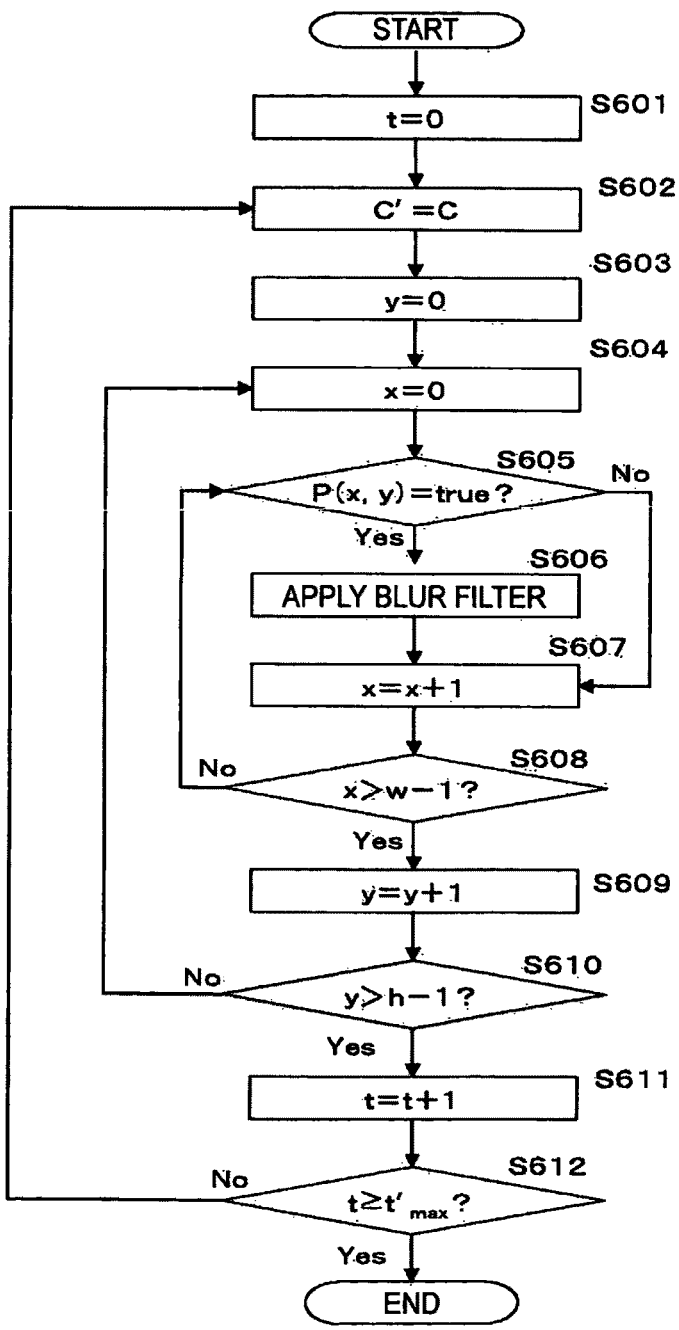
FIG. 13 is a flow chart illustrating a detailed sequence of color blur processing executed in the image processing of the present invention.

The description of the color blur processing (filtering) in FIG. 13 will be continued. When the false-color mask P (x, y) is true in step S605, i.e., when the pixel in question is a false-color pixel, the process proceeds to step S606. In step S606, a blur filter is applied to the color components. This is processing for updating the value of a pixel value C (x, y) indicating the color components of the pixel (x, y) in a color component image C', in accordance with a pixel value C indicating the color components of the surrounding pixels. For example, the average value of the color components C' of nine pixels including the pixel (x, y) to be processed and its surrounding eight pixels is determined and a moving-average filter is applied such that the average value is set as an updated pixel value C (x, y) of the pixel (x, y) to be processed.

After the blue-filter application processing in step S606 is finished, the coordinates of the pixel to be processed are updated and the maximum values are checked in steps S607 to S610. In step S607, the value of the x coordinate is increased by 1. Next, in step S608, a determination is made as to whether x>w−1 is satisfied. When it is determined that x>w−1 is satisfied, the process proceeds to step S608. When it is determined that x>w−1 is not satisfied, the process returns to step S604, and similar processing is executed on a pixel for which the x-coordinate has been updated and the blur processing is executed as needed.

When it is determined that x>w−1 is satisfied in step S608, the process proceeds to step S609, in which the y coordinate is increased by 1. In next step S610, the y coordinate is compared with h−1, which is the maximum value of the y coordinate. When it is determined that y>h−1 is not satisfied, the process proceeds to step S603, and similar processing is executed on a pixel having an updated y coordinate and the blur processing is executed as needed.

When it is determined that y>h−1 is satisfied in step S610, the process proceeds to S611. In step S611, processing for increasing the number t of repetitions of the color blur processing (filtering) by 1 is performed. In step S612, a determination is made as to whether or not the number t of repetitions is a predetermined threshold t'max or more. For t<t'max, the process returns to step S602, and for t≥t'max, the color blur processing (filtering) is finished.

With the processing described above, the color blur processing (filtering) in step S106 shown in FIG. 2 is finished. When the color blur processing (filtering) in step S106 is finished, in next step S107, the luminance component image $L_{in}$ of the original image and the color component image C resulting from the above-described processing are converted and a resulting image $RGB_{out}$ is output as an RGB color image, thereby completing the entire processing.

Although an example in which false color is determined as purple in step S404 shown in FIG. 7 has been described in the above-descried processing example, the color of false color is not limited to purple and may be, for example, green-tinted color. In such a case, the false color is set as different color in step S404 and a false-color area mask P (x, y) for determining a pixel having the set color as false color is configured to thereby allow processing corresponding to arbitrary color.

When multiple different colors, for example, multiple colors including purple and green, are corrected, the processing shown in FIG. 2 may be executed on the different colors multiple times or may be executed using a configuration in which the false-color area mask P (x, y) that determines, as true, the pixel values of multiple colors including purple and green is set as the mask. This makes it possible to correct false color containing multiple colors.

Figure 14:
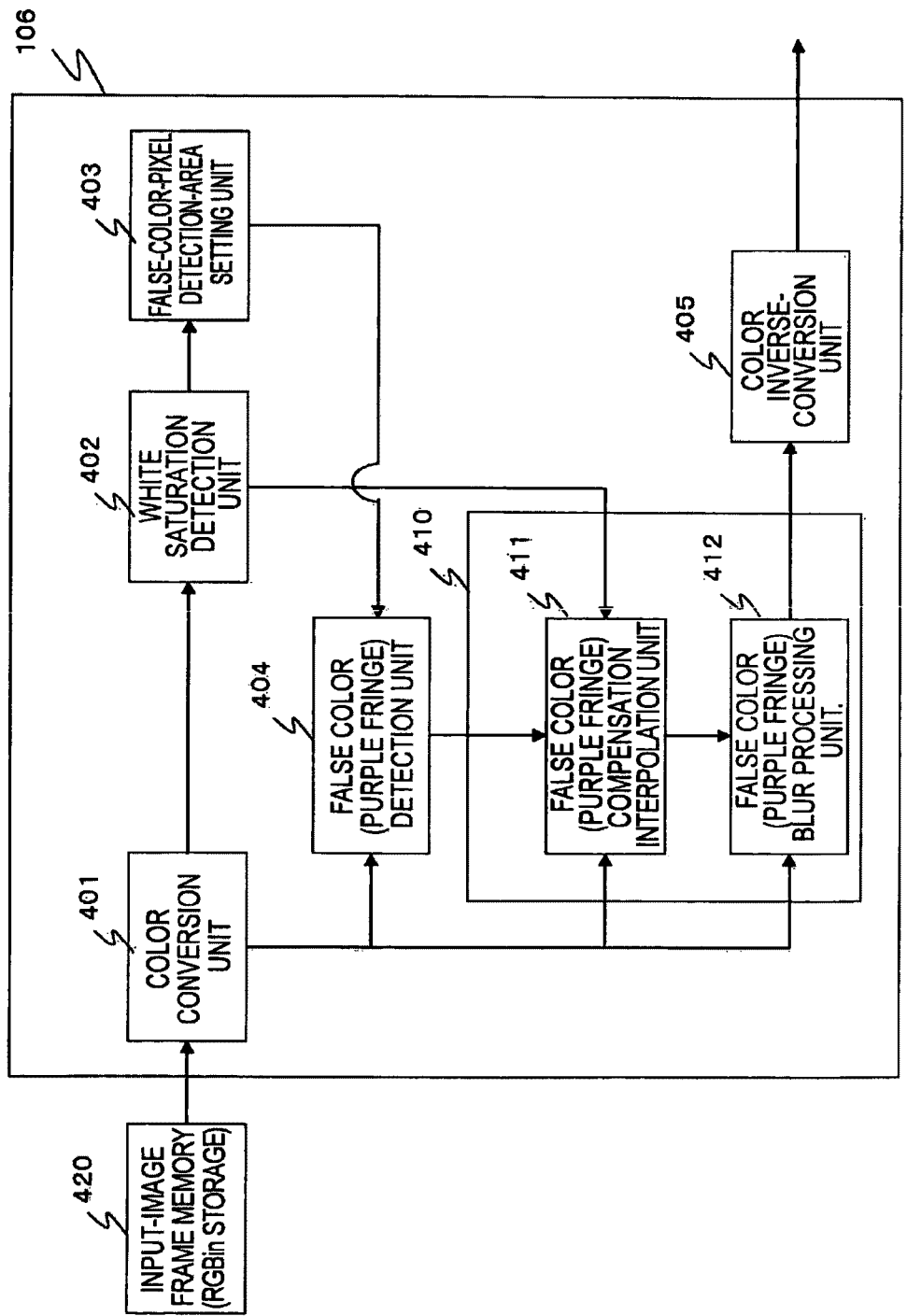
FIG. 14 is a block diagram illustrating the functional configuration of a digital signal processing for executing false-color correction according to a first embodiment, in the image processing apparatus of the present invention.

FIG. 14 is a block diagram showing the functional configuration of a digital signal processor (DSP) (corresponding to the DSP 106 shown in FIG. 1) in the image processing apparatus of the present invention which executes the above-described processing. Processing executed by the digital signal processor (DSP) 106 will be described with reference to the block diagram shown in FIG. 14 while comparing with the flow chart shown in FIG. 2.

In terms of functions, as shown in FIG. 14, the digital signal processor (DSP) 106 has a color conversion unit 401, a white-saturation detection unit 402, a false-color-pixel detection-area setting unit 403, a false color (purple fringe) detection unit 404, a pixel-value correction unit 410, and a color inverse-conversion unit 405. The pixel-value correction unit 410 includes a false color (purple fringe) compensation interpolation unit 411 and a false color (purple fringe) blur processing unit 412.

The digital signal processor (DSP) 106 receives image data ($RGB_{in}$) from an input-image frame memory 420 and the color conversion processing unit 401 converts the color space of the input RGB image and separates it into luminance components and color components. The processing executed by the color conversion processing unit 401 corresponds to the processing in step S101 in the flow chart shown in FIG. 2. The input image $RGB_{in}$ is converted and is separated into a luminance component image $L_{in}$ and a color component image $C_{in}$. That is, the RGB-color input image is converted into a color space having luminance components and a color space having color components. YCbCr, CIE L*a*b*, or the like can be used for the color space.

Next, based on the data converted by the color conversion processing unit 401, the white-saturation detection unit 402 detects a pixel portion that has white saturation. This processing corresponds to step S102 in the flow chart shown in FIG. 2. Specifically, as described with reference to the flow chart shown in FIG. 4, a pixel having a luminance that is greater than or equal to a predetermined luminance threshold is detected and processing for generating a white saturation mask S (x, y) for identifying the white saturated pixel is executed.

The false-color-pixel detection-area setting unit 403 performs processing for setting a false-color-pixel detection area at portions around the white-saturated pixel detected by the white-saturation detection unit 402. This area setting processing is processing for determining an area in which false color can be generated around a white-saturated pixel (x, y) that satisfies the white-saturation mask S (x, y)=true, and the false-color-pixel detection-area determination information is used therefor. This processing corresponds to step S103 in the flow chart shown in FIG. 2 and is executed in accordance with the processing flow shown in FIG. 5.

For example, using a lookup table (LUT) having false-color-pixel detection-area information associated with the distance from the optical center on the image to the white-saturated pixel (x, y) and the diaphragm and focal distance information during the photography of image data, the false-color-pixel detection-area setting unit 403 sets a false-color-pixel detection area around each white-saturated pixel (x, y). When the diaphragm and focal distance information and so on during the photography of image data are not available, the false-color-pixel detection area may be determined based on only the distance from the optical center on the image to the white saturated pixel (x, y). Also, a certain area around the white-saturated pixel (x, y) may be always set as the false-color-pixel detection area, without the use of the information, such as the distance from the optical center to the white-saturated pixel (x, y).

As described above with reference to FIG. 6, the false-color-pixel detection-area setting unit 403 determines, as four scalar values ($x_0, x_1, y_0, y_1$), the range of the false-color-pixel detection area around the white-saturated pixel (x, y) 201 and further generates a false-color area mask P that is obtained by removing white-saturated pixels in that area.

The false color (purple fringe) detection unit 404 uses the false-color area mask P set by the false-color-pixel detection-area setting unit 403 and further executes processing for detecting pixels determined to have false color (purple fringe) by color determination processing for each pixel. That is, the false-color area mask P is updated to generate a false-color area mask P that is capable of identifying only false-color pixels to be corrected. This processing corresponds to step S104 in the flow chart shown in FIG. 2 and is executed in accordance with the processing flow shown in FIG. 7. As described above, color to be determined as false color is arbitrary, and thus a configuration in which only purple having a specific color value is set as false color or a configuration in which multiple colors such as green and purple are set as false color is possible.

The false color (purple fringe) compensation interpolation unit 411 performs processing for correcting a pixel determined to have false color by the false color (purple fringe) detection unit 404. The processing corresponds to step S105 in the flow chart shown in FIG. 2 and is executed in accordance with the processing flows shown in FIGS. 11 and 12. This pixel-value correction processing includes the compensation interpolation processing (see FIGS. 10 and 11) executed on a pixel, determined to have false color (purple fringe), based on the values of pixels other than the surrounding false-color and white-saturated pixels, and the color-saturation reduction processing (see FIG. 12) for false color (purple fringe) pixels that have not been corrected by a predetermined number of repetitions of the compensation interpolation processing.

The false color (purple fringe) blur processing unit 412 executes blur processing on the data corrected by the processing of the false color (purple fringe) compensation interpolation unit 411. This processing corresponds to step S106 in the flow chart shown in FIG. 2 and is executed in accordance with the processing flow shown in FIG. 13.

The false color (purple fringe) blur processing unit 412 extracts a pixel determined to have false color by the false color (purple fringe) detection unit 404 and applies a blur filter to the color components. For example, the false-color (purple) blue processing unit 412 determines the average value of nine pixels including a pixel (x, y) to be processed and its surrounding eight pixels and performs moving-average filter processing for setting the average value as an updated pixel value of the pixel (x, y) to be processed.

The color inverse-conversion unit 405 converts the luminance component image $L_{in}$ of the original image and the color component image C, which is a result of the above-described processing, and outputs a resulting image $RGB_{out}$ as an RGB color image.

When the present invention is applied, it is possible to perform appropriate correction on false color, such as purple fringe, caused by chromatic aberration occurred to an image photographed by a camera, and it is possible to achieve the generation and output of high-quality image data. With a conventional camera, there is a possibility that an unnatural image is photographed unless settings, such as a lens diaphragm, are adjusted in a situation in which purple fringe is generated. However, when the image processing of the present invention is applied, it is possible to perform correction so that the photographed image looks more natural. Thus, there is no need to pay attention to the lens diaphragm and the focal distance such that purple fringing does not occur during photography, thus making it possible to perform photography with a higher degree of freedom.

[Second Embodiment]

Next, the configuration of a second embodiment of the present invention will be described. As described in detail with reference to the flow in FIG. 5 for the first embodiment, in the false-color-pixel detection-area setting processing in step S103 in the flow of FIG. 2, when the pixel value of a pixel position (x, y) indicates a white-saturated pixel in step S304 in FIG. 5, the false-color-pixel detection area ($x_0, x_1, y_0, y_1$) is set around the white-saturated pixel in step S305 and the processing (step S104 in FIG. 2 and the flow in FIG. 7) for detecting false-color pixels from the false-color-pixel detection area ($x_0, x_1, y_0, y_1$) is executed.

In the processing in the first embodiment described above, the processing using the preset false-color-image detection-area determination information, such as the lookup table (LUT) in which a false-color-pixel detection area corresponding to an image area is set based on the characteristics of the optical system of the image capture system, is used to set the false-color image detection area ($x_0, x_1, y_0, y_1$) around a white-saturated pixel.

As described above, white-saturated pixels included in a photographed image are high-luminance pixels, i.e., are saturated pixels in the image. For example, for image data whose luminance value can be set in the range of 0 to 255, all pixels exceeding 250 are determined as white-saturated pixels and the false-color-pixel detection area ($x_0, x_1, y_0, y_1$) is set around the white saturated pixels based on the lookup table. However, white-saturated pixels, i.e., high-luminance pixels in a photographed image, are not all generated based on a subject having the same brightness, but a subject having brightness higher than or equal to a certain brightness results in white-saturated pixels. That is, portions having a somewhat high level of subject brightness to a very high level thereof all appear as white-saturated pixels in a photographed image.

However, an area in which purple fringe appears around a white-saturated pixel varies depending on a change in the brightness level of a subject, i.e., a difference in the brightness of the edge portion. Even for the same white saturated pixels in photographed image data, a white-saturated pixel having a large luminance difference in the edge portion corresponding to a difference in luminance level between the white-saturated pixel and its neighborhood pixels results in a large purple fringe generation area, and a white-saturated pixel having a small luminance difference in the edge portion results in a small purple fringe generation area. Thus, in general, with a white-saturated pixel having a high subject brightness level (an actual luminance), the purple-fringe generation area tends to be reduced, and with a white-saturated pixel having a very high subject brightness level (an actual brightness), the generation area tends to be increased.

Thus, even for the same white saturated pixels in photographed image data, changing and setting false-color-pixel detection area ($x_0, x_1, y_0, y_1$) in accordance with the actual brightness of a subject can achieve reliable and efficient detection of false-color pixels. In the second embodiment, the actual brightness (actual luminance) of a subject is detected or estimated and a false-color-pixel detection area is set in accordance with the subject actual luminance.

As described above, a white-saturated pixel having a large luminance difference in the edge portion corresponding to a difference in luminance level between the white-saturated pixel and its neighborhood pixels results in a large purple fringe generation area, and a white-saturated pixel having a small luminance difference in the edge portion results in a small purple fringe generation area. Thus, a difference in the luminance of the edge portion needs to be considered in order to determine the purple-fringe generation range. In principle, purple fringing occurs because of a point-spread difference due to a light wavelength. The point-spread difference due to the wavelength depends on the type of lens, the settings of a focal distance, a diaphragm, and so on, and a position in an image. Therefore, if the point spread is slightly changed by the light wavelength, false color is generated even at an edge portion where there is no much brightness difference in theory, but false color that is perceivable by a person is not generated when the point-spread difference is very small. However, even when the point-spread difference due to the wavelength is very small, if the edge luminance difference is so large that a high-luminance portion becomes saturated, the small difference is magnified and perceivable false color is generated in a large area. Accordingly, a difference in the luminance of an edge portion, as well as a lens type, settings, and a pixel position, must be considered in order to accurately determine an area in which purple fringe can be generated.

The present embodiment overcomes such problems and provides a method for more accurately detecting and correcting purple fringe generated around a high-luminance pixel. As in the first embodiment, the configuration shown in FIG. 1 is applicable to the configuration of the image processing apparatus in the present embodiment. The entire processing sequence is also executed as processing in accordance with the flow chart shown in FIG. 2, in the same manner as the first embodiment.

Figure 5:
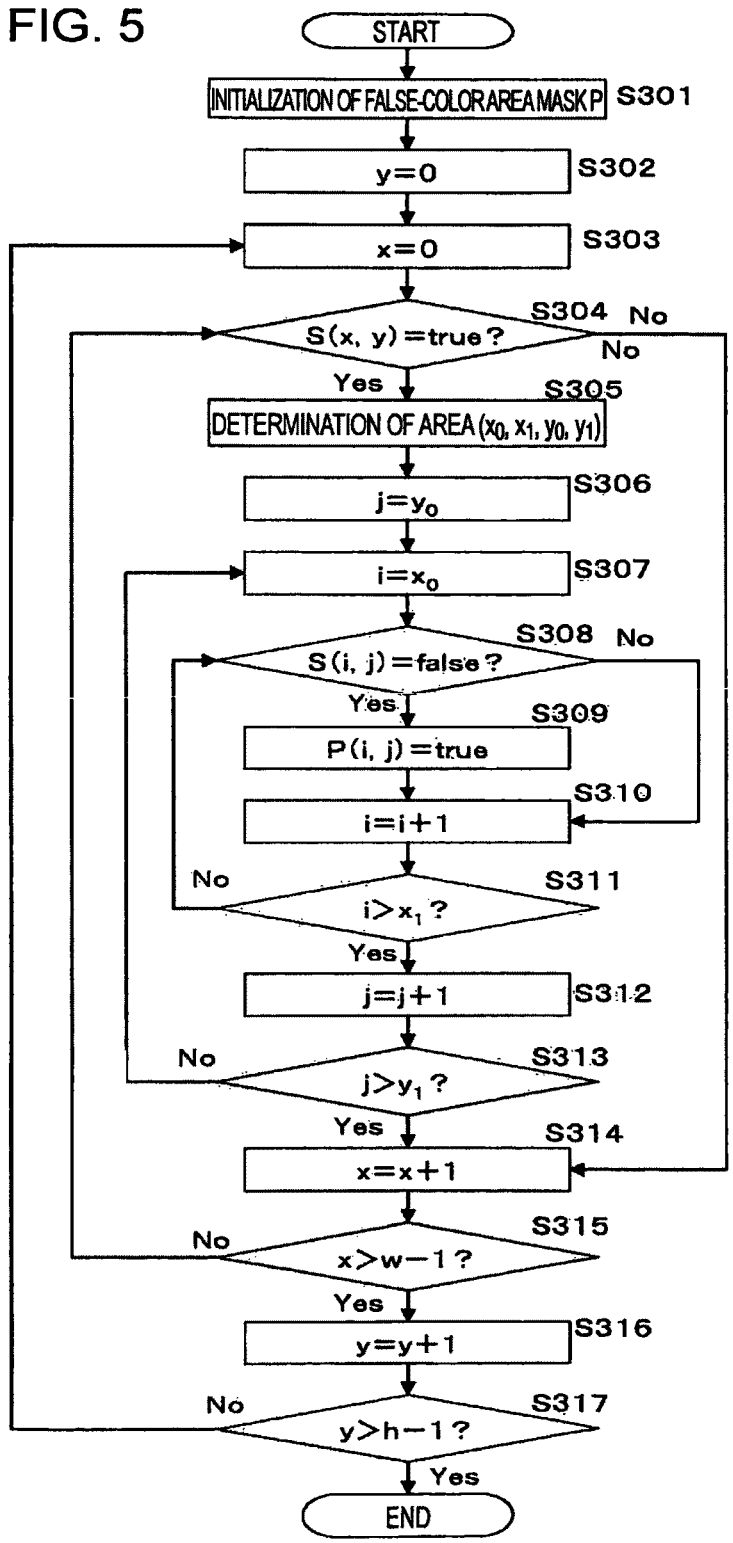
FIG. 5 is a flow chart illustrating a detailed sequence of a false-color-pixel detection-area setting processing executed in the image processing of the present invention.

The difference of the second embodiment from the first embodiment is processing in step S305 in the flow shown in FIG. 5, the processing corresponding to the false-color-pixel detection-area setting processing in step S103 in the flow shown in FIG. 2. That is, processing for setting the false-color-pixel detection area ($x_0, x_1, y_0, y_1$) is different. Other processing, i.e., processing other than step S103 in the flow of FIG. 2 in the first embodiment, is analogous to the processing in the first embodiment.

In the present embodiment, the false-color-pixel detection-area ($x_0, x_1, y_0, y_1$) setting processing in step S305 in the flow of FIG. 5 is executed as processing for setting an optimum false-color-pixel detection area corresponding to the brightness (actual luminance) of a subject. Details of the processing for setting a false-color-pixel detection area in the present embodiment will be described below with reference to FIG. 15 and the subsequent drawings.

Figure 15:
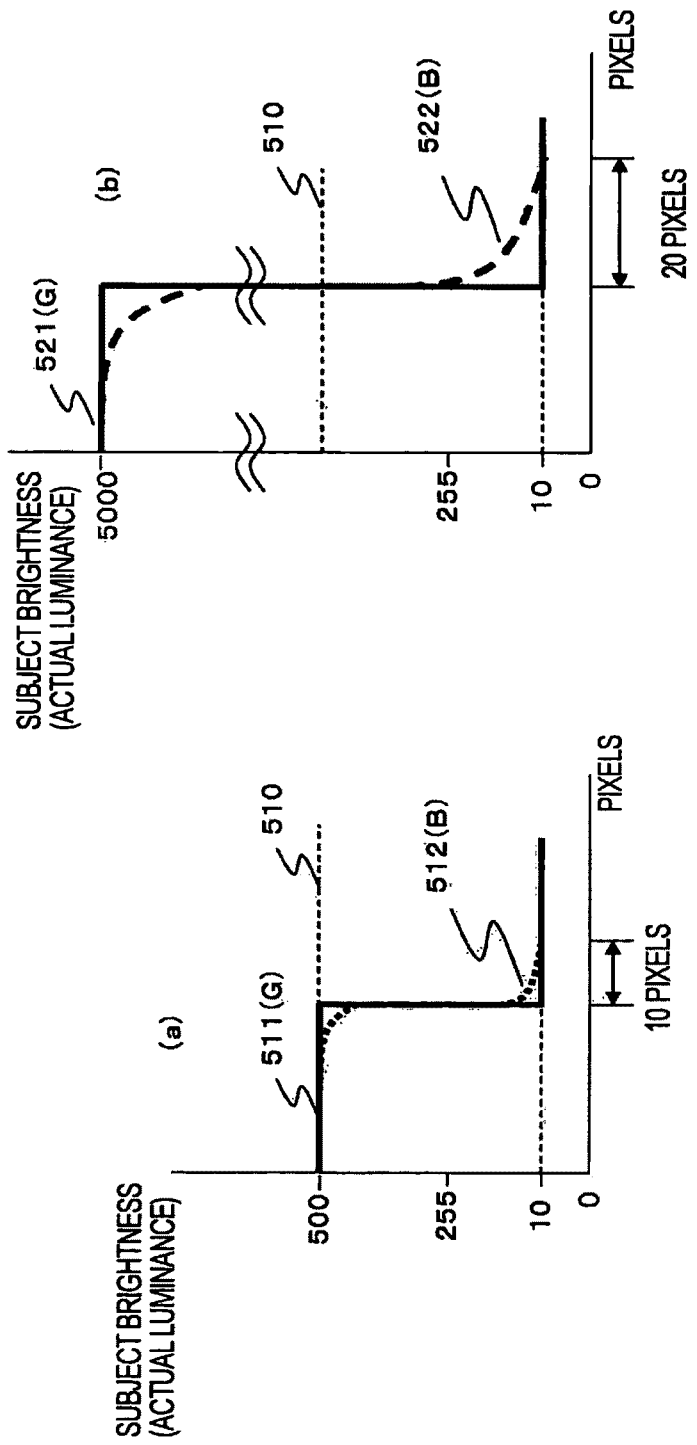
FIG. 15 includes graphs illustrating the relationship a subject actual luminance/an edge configuration and the generation of false color (purple fringe).

The principle of generation of false color (purple fringe) will be described with reference to FIG. 15. FIG. 15(a) and FIG. 15(b) are graphs in which the vertical axis indicates the brightness (actual luminance) of a subject and the horizontal axis indicates the pixel position of photographed image data.

FIG. 15(a) includes the brightness (actual luminance) of a subject=500 and this portion appears as saturated pixels, i.e., white saturated pixels in the photographed image. A saturation threshold line 510 in FIG. 15(a) and FIG. 15(b) represents the saturation threshold of an image capture device with respect to the amount of incident light. That is, when the amount of light larger than or equal to the saturation threshold line 510 is incident, the image is saturated to become a white-saturated image.

FIG. 15(a) shows a case in which a subject having a neighborhood portion whose brightness sharply changes between a subject brightness (actual luminance) of 500 and a brightness (actual luminance) of 10, that is, a subject whose actual luminance changes from 500 to 50, is photographed. FIG. 15(b) shows a case in which a subject whose actual brightness changes from 5000 to 50 is photographed. In FIG. 15(a), a portion having an actual luminance of 500 is located on the saturation threshold line 510 or above, and this portion becomes white saturated portions. In FIG. 15(b), a portion having an actual luminance of 5000 is located on the saturation threshold line 510 or above, and this portion becomes white-saturated pixels, which are expressed as pixels having the same white saturation pixels in the photographed image.

In FIG. 15(a), the solid line (G) is a green channel light-amount line (G) 511 indicating the amount of green channel light incident on the image capture device and the dotted line (B) is a blue channel light-amount line (B) 512 indicating the amount of blue channel light incident on the image capture device. In FIG. 15(b), similarly, the solid line (G) is a green channel light-amount line (G) 521 indicating the amount of green channel light incident on the image capture device and the dotted line (B) is a blue channel light-amount line (B) 522 indicating the amount of blue channel light incident on the image capture device.

FIGS. 15(a) and 15(b) illustrate states in which the same lens was used to perform photography. Since the same lens was used for the photography, the point spread profiles of the green channel and the blue channel are completely the same. However, the actual luminance of the subject in FIG. 15(b) and the actual luminance of the subject in FIG. 15(a) are different from each other and the amount of light incident on the image capture device when the subject in FIG. 15(b) is photographed is far larger than the amount of light incident on the image capture device when the subject in FIG. 15(b) is photographed.

When the amount of incident light is large, the photographed image displays a significant level difference between green and blue. Purple fringe is generated at a portion where a level difference between green and blue in the photographed image is large. Thus, in FIG. 15(a), about a 10-pixel portion at the right side of a white-saturated pixel is a portion where purple fringe is highly likely to be generated, and in FIG. 15(b), about a 20-pixel portion at the right side of a white saturated pixel is a portion where purple fringe is highly likely to be generated. High-luminance portions in FIGS. 15(a) and 15(b) also have a portion where the level difference between green and blue becomes significant, and this portion appears as white saturated pixels in the photographed image and does not become purple fringe pixels.

Figure 16:
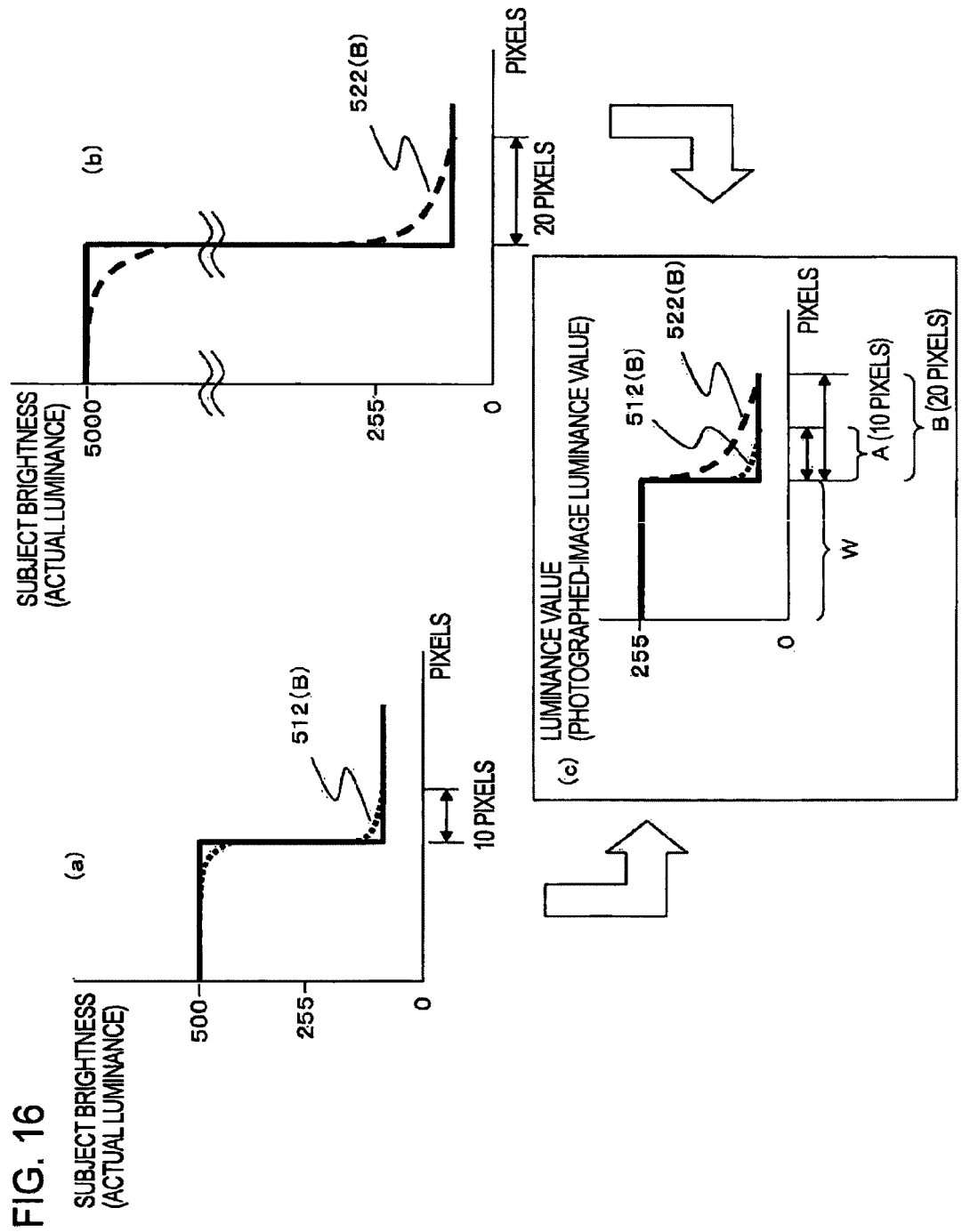
FIG. 16 includes graphs illustrating a subject actual luminance, an edge configuration, a photographed-image luminance, and the generation of false color (purple fringe).

In this manner, purple fringe is often generated around a high-luminance portion that causes white saturation, and the area in which the purple fringe is generated depends on a difference in the luminance of the edge portion. Luminance values and purple-fringe generation areas in photographed images of subjects having actual luminances corresponding to FIGS. 15(a) and 15(b) will be described with reference to FIG. 16. FIGS. 16(a) and 16(b) are graphs corresponding to FIGS. 15(a) and 15(b). FIG. 16(a) corresponds to a subject whose actual luminance changes from 500 to 50 and FIG. 16(b) corresponds to a subject whose actual luminance changes from 5000 to 50. The luminance value distribution of image data obtained when those two images are photographed using the same lens becomes as shown in FIG. 16(c).

In FIG. 16(c), the vertical axis indicates the luminance value of photographed-image data (i.e., the luminance value of a photographed-image) and the horizontal axis indicates a pixel position. In the image data, a luminance level of 255 is a luminance level for the saturation level, and an actual luminance of 500 and an actual luminance of 5000 both result in pixels having a saturation luminance level of about 255, i.e., white-saturated pixels, on a photographed image. Purple fringe appears at a portion in the neighborhood of a white-saturated pixel. This purple-fringe generable area corresponds to about a 10-pixel portion in area A shown in FIG. 16(c) for a subject having an actual luminance of 500 shown in FIG. 16(a) and corresponds to about a 20-pixel portion in area B shown in FIG. 16(c) for a subject having an actual luminance of 5000 shown in FIG. 16(b).

In this manner, purple fringe is generated around a high-luminance portion that causes white saturation, and the area in which the purple fringe is generated depends on a difference in the luminance of the edge portion. The original luminance without saturation needs to be determined in order to determine a difference in the luminance of the edge portion. As one method for addressing this issue, a method in which an image photographed with an image capture device having a low-sensitivity sensor is used is available.

Specifically, an image capture device in which multiple sensors having different sensitivities are arranged is used for a pixel at the same position. For example, two types of sensors, i.e., a normal-sensitivity sensor and a low-sensitivity sensor, are arranged. An image photographed with the normal-sensitivity sensor is used as a photographed image, and the original subject luminance (the actual luminance) of a portion that has become white-saturated pixels of the image photographed with the normal-sensitivity sensor is determined based on an image photographed with the low-sensitivity sensor. Even for a subject having a high luminance that causes white saturation with the normal-sensitivity sensor, the image photographed with the low-sensitivity sensor does not cause white saturation in the photographed image because of the low sensitivity and is output as pixels having luminance values that do not reach the saturation value. Thus, for the subject having an actual luminance of 500 shown in FIG. 16(a) and a subject having an actual luminance of 5000 shown in FIG. 16(b), the images can be output as image data having respective different photographed-image luminance values.

Figure 17:
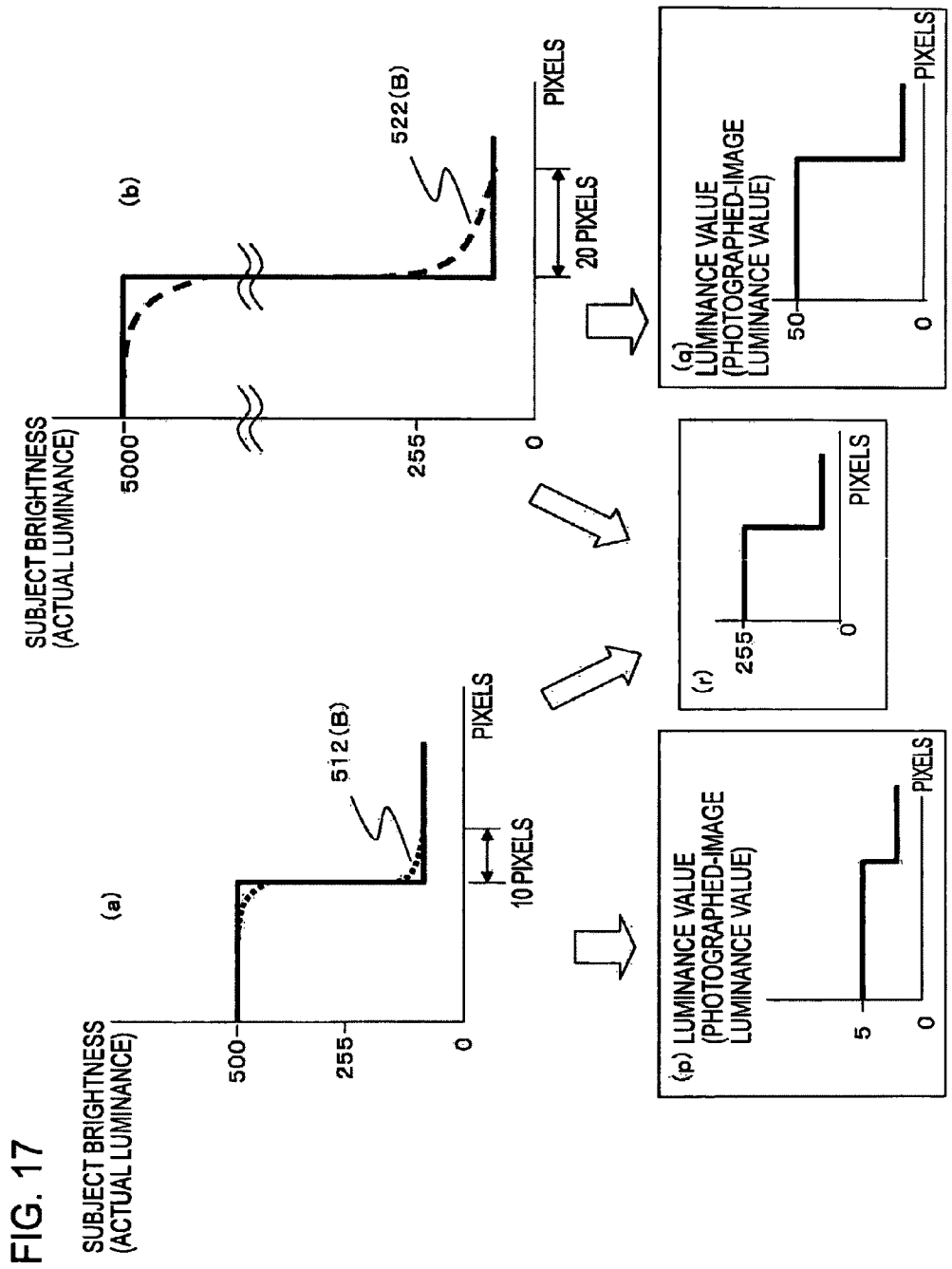
FIG. 17 includes graphs illustrating the luminance information of a reference image obtained using, for example, a low-sensitivity sensor to estimate a subject actual luminance.

Processing for estimating the actual luminance of a subject based on a photographed image using a low-sensitivity sensor will be described with reference to FIG. 17. FIGS. 17(a) and 17(b) are graphs corresponding to FIGS. 15(a) and 15(b) and FIGS. 16(a) and 16(b). FIG. 17(a) corresponds to a subject whose actual luminance changes from 500 to 50 and FIG. 17(b) corresponds to a subject whose actual luminance changes from 5000 to 50. The luminance-value distributions of image data obtained when those two images are photographed using the low-sensitivity sensor become as shown in FIGS. 17(p) and 17(q). The luminance-value distributions of image data obtained when those two image are photographed using the normal-sensitivity sensor become as shown in FIG. 17(r). FIG. 17(r) is a graph similar to FIG. 16(c). For either case of actual luminances of 500 and 5000, the photographed-image luminance value is output at substantially 255, i.e., is output as white-saturated pixels.

However, as shown in FIGS. 17(p) and 17(q), in the luminance-value distributions of image data obtained when photography is performed using the low-sensitivity sensor, an image portion that caused white saturation on the normal-sensitivity photographed image does not become white-saturated pixels and is output as pixels having a luminance value that is less than the saturated pixel value. In the illustrated examples, in the data shown in FIG. 17(p) which is image data of a subject having an actual luminance of 500 shown in FIG. 17(a), an image portion having an actual luminance of 500 is output as image data having a photographed-image luminance of 5, and in the data shown in FIG. 17(q) which is image data of a subject having an actual luminance of 5000 shown in FIG. 17(b), an image portion having an actual luminance of 5000 is output as image data having a photographed-image luminance value of 50. In this manner, when photography is performed using the low-sensitivity sensor, even a portion that causes white saturation with the normal sensor because of a large amount of incident light does not cause white saturation and is output as a pixel having a level value less than the saturation luminance value. Thus, the image data of a somewhat-bright subject and a very-bright subject can be output as image data having different luminance values. In the present embodiment, image data photographed under such conditions different from those for normal photography processing is used as a reference image to determine and estimate the subject actual luminance of a white-saturated pixel portion in a normal photographed image, and based on the estimated result, a false color (purple fringe) generable area is set.

Examples in which the low-sensitivity sensor is used to obtain a reference image for determining the actual luminance of a subject have been described above. As another example, the configuration may be such that photography is performed with a dark exposure by increasing the shutter speed to obtain the reference image. Even when white saturation occurs in a normal photographed image, i.e., occurs in an image photographed with an adequate exposure, the result of the photography with the dark exposure is that white saturation does not occur and pixel values less than the saturation luminance value are output. Thus, an image photographed with an increased shutter speed can also be used as the reference image. For example, when an image photographed with about 1/30th of exposure time in adequate exposure is used as the reference image, it is possible to estimate a subject actual luminance for pixels that have been saturated in the adequate exposure.

As described above, an image photographed under a low exposure condition, such as an image photographed with the low-sensitivity sensor or an image photographed with a high shutter speed, is used as the reference image, the actual luminance of the subject is estimated based on a reference-image luminance value of a portion corresponding to a white-saturated pixel in a normal photographed-image data, and an optimum false color (purple fringe) pixel detection area is set based on the estimated actual luminance.

Figure 18:
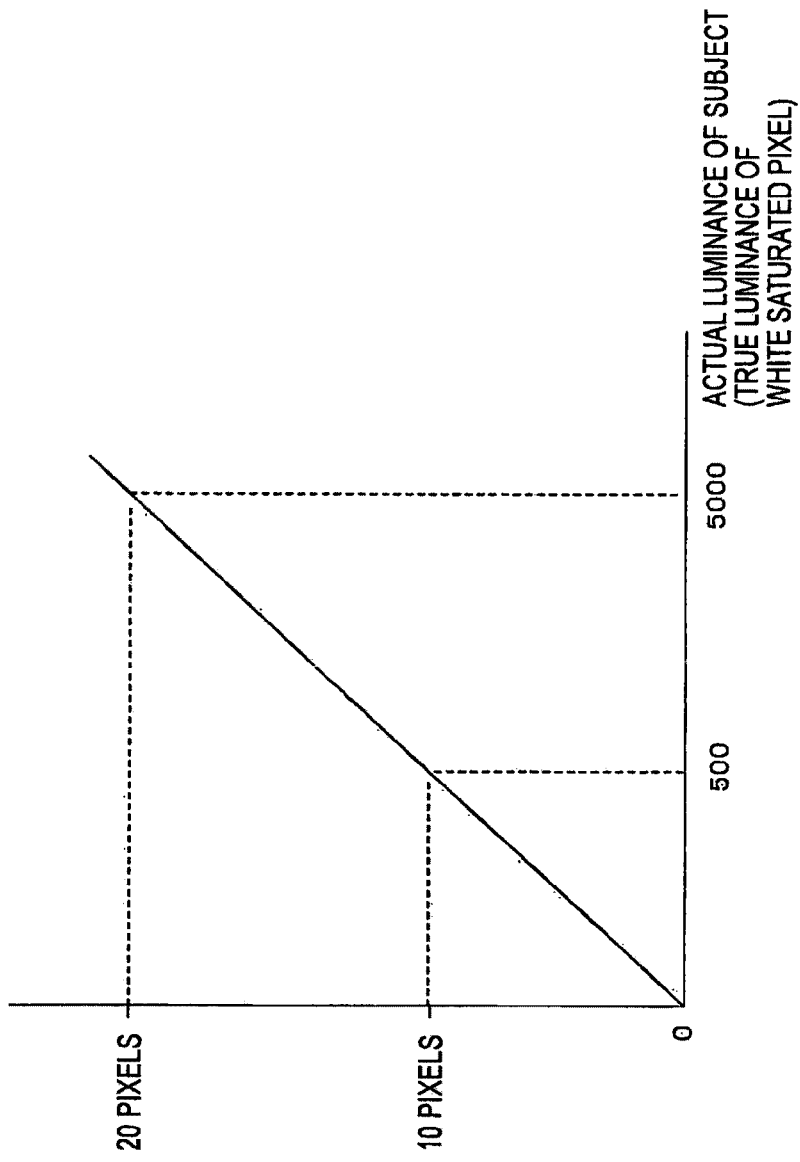
FIG. 18 includes graphs illustrating the relationship between a subject actual luminance and the generation range of false color (purple fringe).

FIG. 18 shows one example of the relationship between a subject actual luminance (the true luminance of a white-saturated pixel) and a false color (purple fringe) generable range (the distance from a white-saturated pixel). The graph shown in FIG. 18 corresponds to the example of FIG. 17 and shows that, when the subject actual luminance is 500, the false color (purple fringe) generable range (the distance from a white-saturated pixel) is 10 pixels from the white-saturated pixel, and when the subject actual luminance is 5000, the false color (purple fringe) generable range (the distance from a white-saturated pixel) is 20 pixels from the white-saturated pixel. The example shown in the figure is one example, and pre-measured data is used for the relationship between the subject actual luminance and the false color (purple fringe) generable range, based on the characteristics of the optical system of the image-capture system.

Figure 19:
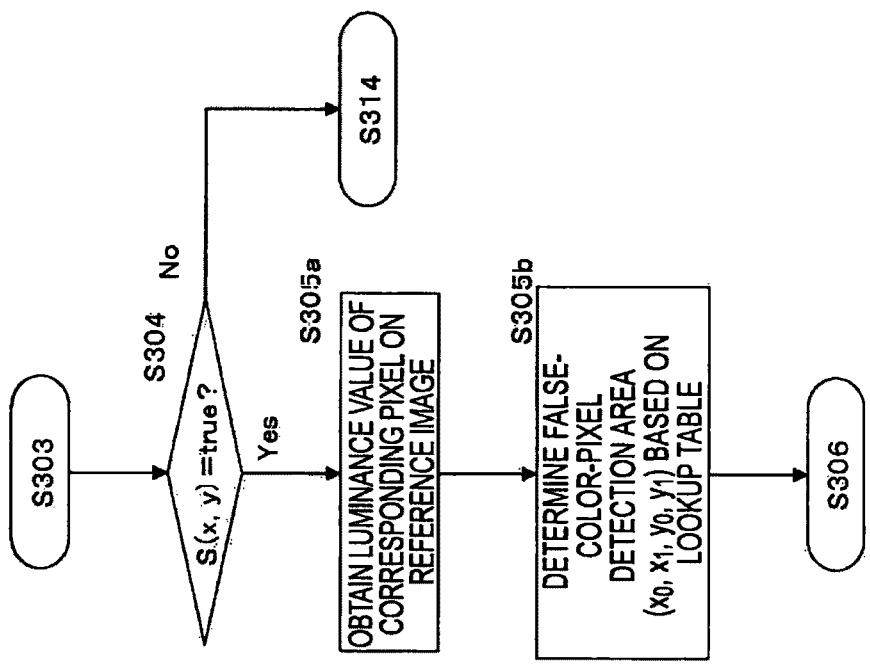
FIG. 19 is a flow chart illustrating a processing procedure for setting a false-color detection area in a second embodiment.

A procedure for the false-color-pixel detection-area setting processing in the present embodiment will be described with reference to the flow shown in FIG. 19. The flow in FIG. 19 is one part of the flow in FIG. 5 illustrated for the first embodiment described above. That is, the flow in FIG. 19 shows the processing in steps S304 and S305 in FIG. 5, i.e., the processing for determining whether or not a pixel of interest is a white-saturated pixel and for setting, when it is a white saturated pixel, a false-color-pixel detection area ($x_0$, $x_1$, $y_0$, $y_1$) around the pixel. In the second embodiment, the processing of this part is executed as processing different from the first embodiment.

The processing sequence of the second embodiment will be described in accordance with the flow in FIG. 19. Step S304 is processing similar to the first embodiment and the pixel value of the white saturation mask S at a set pixel position is determined. At the set pixel position (x, y), for the white saturation mask S (x, y)=false, the process proceeds to step S314 (see FIG. 5) for the processing on a next pixel. If S (x, y) is true, the process proceeds to step S305a. When the white-saturation mask S (x, y) is false for the pixel position (x, y), this means that the pixel value of the pixel poison (x, y) indicates a non white-saturated pixel. When the white-saturation mask S (x, y) is true for the pixel position (x, y), this means that the pixel value of the pixel poison (x, y) indicates a white-saturated pixel.

When the white saturation mask S (x, y) is true for the pixel position (x, y), in step S305a, the pixel value of a reference-image pixel corresponding to the white-saturated pixel position (x, y) is obtained. The reference image refers to, for example, an image photographed with the low-sensitivity sensor described above or an image photographed under a low exposure condition, for example, an image photographed with an high-speed shutter speed and with an adequate exposure or below. Based on the reference image, the pixel value of a reference-image pixel corresponding to the pixel (x, y) determined to be a white-saturated pixel in a normal photographed image, which is an image to be processed, is obtained.

Thereafter, in step S305b, based on the pixel value of the reference-image pixel, a false-color-pixel detection area ($x_0$, $y_0$, $x_1$, $y_1$) is determined using a lookup table (LUT). FIG. 20 shows an example of the data structure of the lookup table (LUT) used in the present invention. The lookup table (LUT) shown in FIG. 20 has a table structure in which "the luminance of a reference image", "the actual luminance of a subject", and "a false color (PF: purple fringe) generable pixel range" are associated with each other. This table is shown as a table corresponding to the example described above with reference to FIGS. 15 to 17.

For example, it is shown that, when the luminance in the reference image is "5", the subject actual luminance is "500", and the "false-color (PF: purple fringe) generable pixel range" in this case is in a range of 10 pixels from a white saturated pixel. Similarly, it is shown that, when the luminance in the reference image is "50", the subject actual luminance is "5000", and the "false-color (PF: purple fringe) generable pixel range" in this case is in a range of 20 pixels from a white saturated pixel.

In step S305b shown in FIG. 19, for example, the "false-color (PF: purple fringe) generable pixel range" set according to the luminance in the reference image is determined from the table shown in FIG. 20, and based on the result, the false-color-pixel detection area $(x_0, x_1, y_0, y_1)$ is determined as an area including the false-color (PF: purple fringe) generable pixel range.

Although the table shown in FIG. 20 has a structure containing the actual luminance data of a subject, this data is not essential. It is sufficient if the table is configured to allow the determination of the false-color-pixel detection area $(x_0, y_0, x_1, y_1)$ based on the luminance of a reference pixel corresponding to a white-saturated pixel on an image to be processed, i.e., a normal photographed image. That is, the table may be configured as a lookup table (LUT) in which "the luminance of a reference image" and "a false-color (PF: purple fringe) generable pixel range" or a false-color-pixel detection area $(x_0, y_0, x_1, y_1)$ are associated with each other.

The functional configuration of a digital signal processor (DSP) (corresponding to the DSP 106 shown in FIG. 1) in the image processing apparatus of the present embodiment which executes the above-described processing will be described with reference to FIGS. 21 and 22.

Figure 21:
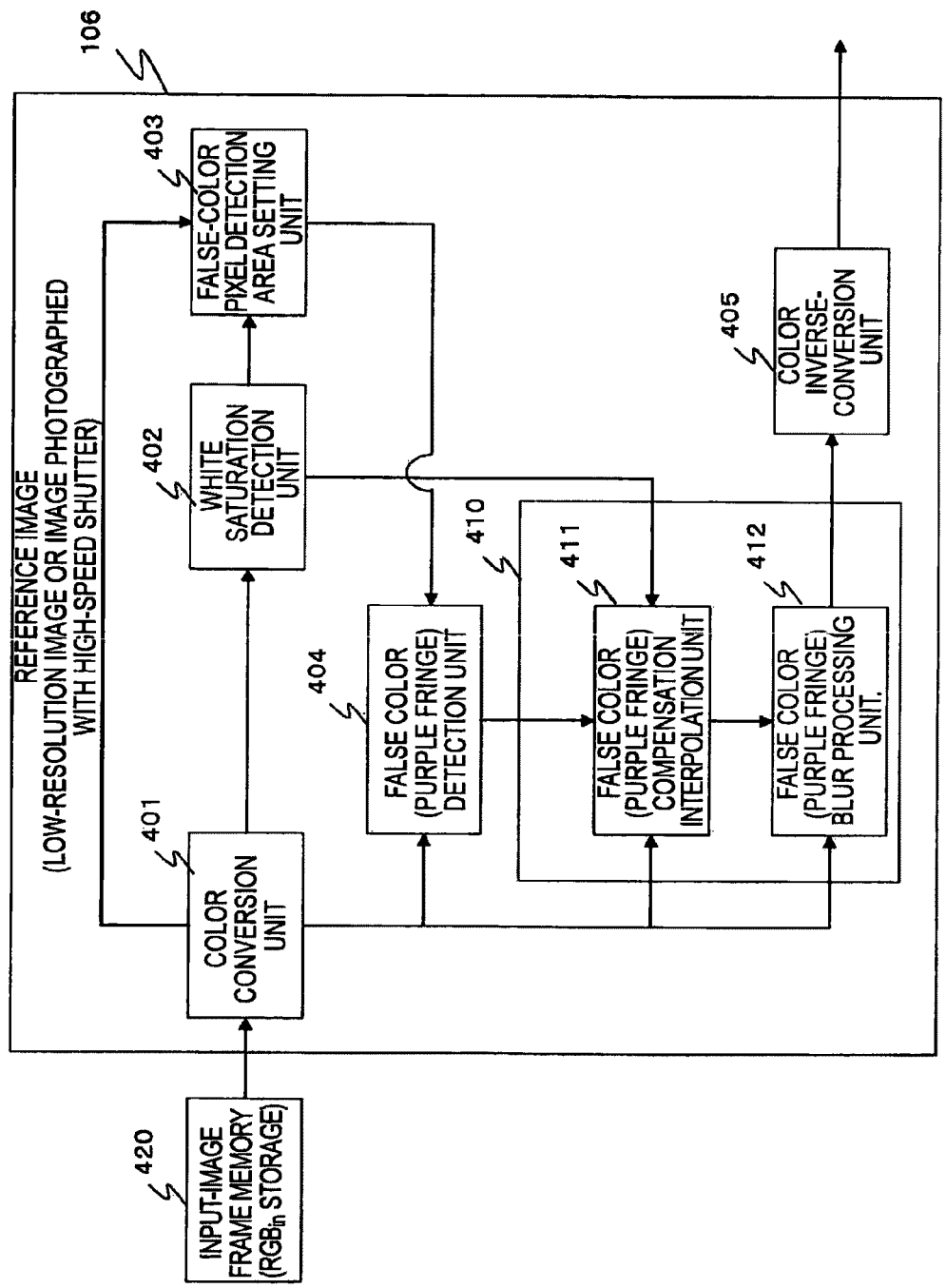
FIG. 21 is a block diagram illustrating the functional configuration of a digital signal processing for executing false-color correction according to the second embodiment, in the image processing apparatus of the present invention.
Figure 22:
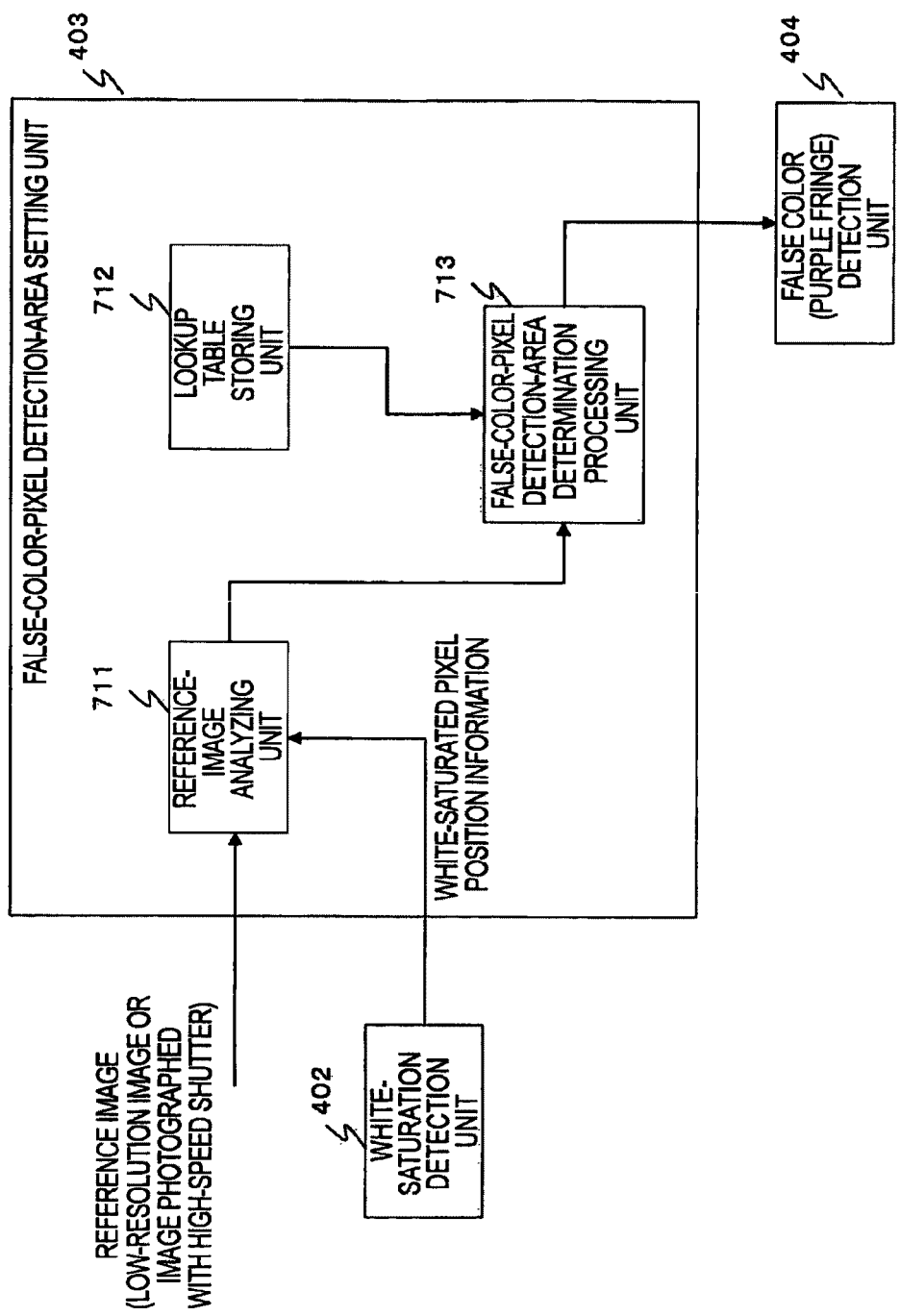
FIG. 22 is a block diagram illustrating the configuration of a false-color-pixel detection-area setting unit in the digital signal processing for executing false-color correction according to the second embodiment, in the image processing apparatus of the present invention.

FIG. 21 is a diagram corresponding to the configuration of the DSP described above with reference to FIG. 14 for the first embodiment and FIG. 22 is a diagram showing the configuration of the false-color-pixel detection-area setting unit 403 shown in FIG. 21. As shown in FIG. 21, as in the first embodiment, the digital signal processor (DSP) in the present embodiment has a color conversion unit 401, a white-saturation detection unit 402, the false-color-pixel detection-area setting unit 403, a false color (purple fringe) detection unit 404, a pixel-value correction unit 410, and a color inverse-conversion unit 405. The pixel-value correction unit 410 includes a false color (purple fringe) compensation interpolation unit 411 and a false color (purple fringe) blur processing unit 412.

The digital signal processor (DSP) 106 receives image data $(RGB_{in})$ from an input-image frame memory 420 and the color conversion processing unit 401 converts the color space of the input RGB image and separates it into luminance components and color components. The processing executed by the color conversion processing unit 401 corresponds to the processing in step S101 in the flow chart shown in FIG. 2. The input image $RGB_{in}$ is converted and is separated into a luminance component image $L_{in}$ and a color component image $C_{in}$. That is, the input RGB-color image is converted into a color space having luminance components and a color space having color components. YCbCr, CIE L*a*b*, or the like can be used for the color space.

Next, based on the data converted by the color conversion processing unit 401, the white-saturation detection unit 402 detects a pixel portion where white saturation occurs. This processing corresponds to step S102 in the flow chart shown in FIG. 2. Specifically, as described with reference to the flow chart shown in FIG. 4, a pixel having a luminance that is higher than or equal to a predetermined luminance threshold is detected and a white saturation mask S (x, y) for identifying the white saturated pixel is generated.

The false-color-pixel detection-area setting unit 403 performs processing for setting a false-color-pixel detection area at portions around the white-saturated pixel detected by the white-saturation detection unit 402. This area setting processing is processing for determining an area in which false color can be generated around a white-saturated pixel (x, y) that satisfies the white-saturation mask S (x, y)=true, and as described above, an optimum false-color-pixel diction-area setting processing using the reference image is executed.

The functional configuration of the false-color-pixel detection-area setting unit 403 will be described with reference to FIG. 22. As shown in FIG. 22, the false-color-pixel detection-area setting unit 403 has a reference-image analyzing unit 711, a lookup table storing unit 712, and a false-color-pixel detection-area determination processing unit 713. The reference-image analyzing unit 711 obtains, from the white-saturation detection unit 402, a white-saturated-pixel position in an image to be processed, and obtains the luminance value of a reference-image pixel corresponding to the white-saturated pixel position. The reference image is an image photographed from the same subject as the image to be processed but is an image photographed with the low-sensitivity sensor or an image photographed with an exposure less than an adequate exposure, for example, with the setting of a high-speed shutter speed.

The false-color-pixel detection-area determination processing unit 713 receives, from the reference-image analyzing unit 711, the luminance value of the reference-image pixel corresponding to the white-saturation pixel position in the image to be processed. Based on the received value, the false-color-pixel detection-area determination processing unit 713 determines a false-color-pixel detection area by referring to a lookup table (LUT) stored in the lookup table storing unit 712. For example, as described above with reference to FIG. 20, the lookup table (LUT) is a lookup table (LUT) in which "the luminance of a reference image" and "a false color (PF: purple fringe) generable pixel range" or a "false-color-pixel detection area $(x_0, y_0, x_1, y_1)$" are associated with each other.

In accordance with the luminance value of the reference-image pixel corresponding to the white-saturated pixel position in the image to be processed, the false-color-pixel detection-area determination processing unit 713 determines a false-color-pixel detection area $(x_0, y_0, x_1, y_1)$. The false-color-pixel detection-area determination processing unit 713 determines, as four scalar values $(x_0, x_1, y_0, y_1)$, the range of a false-color-pixel detection area around a white-saturated pixel (x, y) and further generates a false-color area mask P that is obtained by removing white-saturated pixels from that area (see the processing flows in FIGS. 5 and 19). This processing makes it possible to set a false-color-pixel detection area, considering an actual subject luminance (an actual luminance), thereby achieving optimum area setting. Referring back to FIG. 21, the description of the present embodiment will be continued.

The false color (purple fringe) detection unit 404 uses the false-color area mask P set by the false-color-pixel detection-area setting unit 403 and further executes processing for detecting pixels determined to have false color (purple fringe) by color determination processing for each pixel. That is, the false-color area mask P is updated to generate a false-color area mask P that is capable of identifying only false-color pixels to be corrected. This processing corresponds to step S104 in the flow chart shown in FIG. 2 and is executed in accordance with the processing flow shown in FIG. 7. As described above, color to be determined as false color is arbitrary, and thus a configuration in which only purple having a specific color value is set as false color or a configuration in which multiple colors such as green and purple are set as false color is possible.

The false color (purple fringe) compensation interpolation unit 411 performs processing for correcting the pixel determined to have false color by the false color (purple fringe) detection unit 404. The processing corresponds to step S105 in the flow chart shown in FIG. 2 and is executed in accordance with the processing flows shown in FIGS. 11 and 12.

This pixel-value correction processing includes the compensation interpolation processing (see FIGS. 10 and 11) executed on a pixel, determined to have false color (purple fringe), based on the values of pixels other than its surrounding false-color and white-saturated pixels, and the processing (see FIG. 12) for reducing the color saturation of false color (purple fringe) pixels that have not been corrected by a predetermined number of repetitions of the compensation interpolation processing.

The false color (purple fringe) blur processing unit 412 executes blur processing on data corrected by the processing of the false color (purple fringe) compensation interpolation unit 411. This processing corresponds to step S106 in the flow chart shown in FIG. 2 and is executed in accordance with the processing flow shown in FIG. 13.

The false color (purple fringe) blur processing unit 412 extracts a pixel determined to have false color by the false color (purple fringe) detection unit 404 and applies a blur filter to the color components. For example, the false color (purple fringe) blue processing unit 412 determines the average value of nine pixels including a pixel (x, y) to be processed and its surrounding eight pixels and performs moving-average filter processing for setting the average value as an updated pixel value of the pixel (x, y) to be processed.

The color inverse-conversion unit 405 converts the luminance component image $L_{in}$ of the original image and the color component image C, which is a result of the above-described processing, and outputs a resulting image $RGB_{out}$ as an RGB color image.

When the present embodiment is applied, it is possible to perform appropriate correction on false color, such as purple fringe, caused by chromatic aberration occurred to an image photographed by a camera, and is possible to achieve the generation and output of high-quality image data.

In addition, according to the second embodiment, a subject actual luminance corresponding a white-saturated pixel is estimated based on a reference image, a false color (purple fringe) detection area corresponding to the subject actual luminance is set, and false color (purple fringe) pixels in the set area are detected and corrected. Thus, a false color (purple fringe) detection area corresponding to an area in which false color (purple fringe) is likely to be generated can be set, without the set false color (purple fringe) detection area becoming too large or too small. False color (purple fringe) pixels can be reliably and efficiently detected, the accuracy of image correction is increased, and the efficiency is increased.

The present invention has been described above in detail with reference to the particular embodiments. However, it is obvious that those skilled in the art can make a modification and substitution to the embodiments in a scope without departing from the substance of the present invention. That is, the present invention has been disclosed by way of example and thus should not be construed as limiting. The scope of the claims should be construed in order to understand the substance of the present invention.

The series of processing described herein can be executed by hardware, software, or a combined configuration thereof. When the processing is executed with software, it can be executed by loading a program, in which the processing sequence is recorded, into an in-computer memory built into dedicated hardware or installing the program onto a general-purpose computer that is capable of performing various types of processing.

For example, the program can be pre-stored on a storage medium, such as a hard disk or a ROM (read only memory). Alternatively, the program can be temporarily or permanently stored (recorded) on a removable storage medium, such as a flexible disk, a CD-ROM (compact disc read only memory), an MO (magneto optical) disk, a DVD (digital versatile disc), a magnetic disk, or a semiconductor memory. Such removable storage media can be supplied as the so-called "package software".

In addition to installing the program from the above-described removable storage media onto a computer, the program can be wirelessly transferred from a download site to the computer or can be transferred to the computer by a wired connection through a network such as a LAN (local area network) and/or the Internet, so that the program transferred in such a manner is received by the computer and is stored on a storage medium such as a built-in hard disk.

The various types of processing described herein not only include processing that is time-sequentially executed according to the described sequence but also include processing that is concurrently or individually executed according to the throughput of an apparatus that executes the processing or according to need. The term "system" herein refers to a logical combination of a plurality of apparatuses and is not limited to a system in which individual apparatus are included in the same housing.

Industrial Applicability

As described above, according to the configuration of the present invention, a white-saturated pixel is detected from image data, a false-color-pixel detection area is set around the detected white-saturated pixel, pixels having color corresponding to false color such as purple fringe are detected from the set area, the detected pixels are determined as false-color pixels, and correction processing based on the values of the surrounding pixels is executed on the identified false-color pixels. Thus, it is possible to efficiently detect the area of false color, such as purple fringe, generated in the neighborhood of a white-saturated pixel and to partially correct the values of pixels. It is also possible to generate and output high-quality image data without affecting the entire image.

According to the configuration of the present invention, it is possible to perform appropriate correction on false color, such as purple fringe, caused by chromatic aberration occurred to an image photographed by a camera, and it is possible to achieve the generation and output of high-quality image data. With a conventional camera, there is a possibility that an unnatural image is photographed unless settings, such as a lens diaphragm, are adjusted in a situation in which purple fringe is generated. However, when the present invention is applied, it is possible to efficiently extract and correct false color, such as purple fringe, contained in a photographed image and it is possible to generate and output a high-quality image. Thus, there is no need to pay attention to the lens diaphragm and the focal distance such that purple fringing does not occur during photography, thus making it possible to perform photography with a higher degree of freedom.

In addition, according to the configuration of the present invention, a subject actual luminance corresponding a white-saturated pixel is estimated based on a reference image, a false color (purple fringe) detection area corresponding to the subject actual luminance is set, and false color (purple fringe) pixels in the set area are detected and corrected. Thus, a false color (purple fringe) detection area corresponding to an area in which false color (purple fringe) is likely to be generated can be set, without the set false color (purple fringe) detection area becoming too large or too small. False color (purple fringe) pixels can be reliably and efficiently detected, the accuracy of image correction is increased, and the efficiency is increased.

The invention claimed is:

1. A method for automatically correcting false color artifacts in a region of a color digital image comprised of a two-dimensional array of image pixels, the false color artifacts occurring around saturated image pixels captured by an electronic imager associated with a color filter array, the method being performed on a processor and comprising the steps of:
   (a) detecting saturated image pixels in the color digital image through threshold processing for at least a color component of the color digital image;
   (b) providing a search area through dilate processing for portions around the detected saturated image pixels;
   (c) providing false color detection pixels in the search area;
   (d) providing false color pixels in the color detection pixels by checking whether color components of the false color detection pixels indicate the occurrence of the false color artifacts; and
   (e) correcting pixel values of the false color pixels.

2. The method of claim 1, wherein the false color artifact is purple fringe.

3. The method of claim 1, wherein the false color artifact is green-tint.

4. The method of claim 1, wherein said saturated image pixels are white-saturated pixels.

5. The method of claim 1, wherein said step of detecting is performed using a lookup table (LUT) containing a false-color-pixel detection area corresponding to an image area.

6. The method of claim 1, wherein said step of providing false color detection pixels is performed by checking whether the pixels in the search are included in the detected saturated image pixels.

7. The method of claim 1, wherein said step of correcting pixel values of the false color pixels is performed based on the values of the surrounding pixels of the false color pixels.

8. The method of claim 1, wherein one or more of said saturated image pixels, said search area, said false color detection pixels and said false color pixels are provided in a binary mask format.

9. The method of claim 1, further comprising the step of color-space conversion processing.

10. The method of claim 9, wherein said step of color-space conversion processing is performed prior to the step of detecting saturated image pixels.

11. The method of claim 9, wherein said step of color-space conversion processing includes separating the color digital image into a luminance component image and a color component image.

12. A method of claim 9, wherein said step of color-space conversion processing includes converting data into a format including a luminance component as a color component, and wherein the color component of the color digital image is the luminance component.

13. The method of claim 1, further comprising the step of color blur processing.

14. The method of claim 1, further comprising the step of color-space inverse-conversion processing.

15. The method of claim 14, wherein said step of color-space inverse-conversion processing includes converting a luminance component image and a color component image of a color corrected image into an RGB color image.

* * * * *